(12) United States Patent
Yamamoto et al.

(10) Patent No.: US 8,614,844 B2
(45) Date of Patent: Dec. 24, 2013

(54) OPTICAL SCANNING APPARATUS AND OPTICAL REFLECTION DEVICE USED THEREFOR

(75) Inventors: Yuta Yamamoto, Osaka (JP); Shinsuke Nakazono, Osaka (JP); Tsutomu Ikeda, Kyoto (JP)

(73) Assignee: Panasonic Corporation, Osaka (JP)

( * ) Notice: Subject to any disclaimer, the term of this patent is extended or adjusted under 35 U.S.C. 154(b) by 73 days.

(21) Appl. No.: 13/471,780

(22) Filed: May 15, 2012

(65) Prior Publication Data

US 2012/0293850 A1    Nov. 22, 2012

(30) Foreign Application Priority Data

May 17, 2011    (JP) .................................. 2011-109996
May 17, 2011    (JP) .................................. 2011-110775

(51) Int. Cl.
  *G02B 26/08*    (2006.01)
(52) U.S. Cl.
  USPC ...................................................... 359/212.1

(58) Field of Classification Search
  USPC ..................... 359/199.1–199.4, 212.1–214.1, 359/223.1–226.1; 347/243, 259–261
  See application file for complete search history.

(56) References Cited

U.S. PATENT DOCUMENTS

| 5,606,447 A | 2/1997 | Asada et al. |
| 2009/0153932 A1* | 6/2009 | Davis et al. ................ 359/199.2 |

FOREIGN PATENT DOCUMENTS

| JP | 2722314 | 3/1998 |
| JP | 2004-302104 | 10/2004 |

* cited by examiner

*Primary Examiner* — Euncha Cherry
(74) *Attorney, Agent, or Firm* — Wenderoth, Lind & Ponack, L.L.P.

(57) ABSTRACT

An optical scanning apparatus is configured to include a light source that emits a beam of light, and a scanning device that scans the beam of light in two axial directions that are mutually substantially perpendicular at a first frequency $f_H$ and a second frequency $f_L$. The scanning device calculates the first frequency $f_H$ and the second frequency $f_L$ by using predetermined mathematical formulas, and scans the beam of light at the calculated first frequency $f_H$ and second frequency $f_L$.

14 Claims, 13 Drawing Sheets

WHEN N IS ODD NUMBER
a=1, b=1

WHEN N IS EVEN NUMBER
a=1, b=1

OPTICAL SCANNING APPARATUS AND OPTICAL REFLECTION DEVICE USED THEREFOR

BACKGROUND OF THE INVENTION

1. Field of the Invention

The present invention relates to an optical scanning apparatus for use in a radar apparatus, a display apparatus and the like, and an optical reflection device used for the same optical scanning apparatus.

2. Description of the Related Art

A vehicle-mounted radar apparatus to scan a beam of light emitted from a light source of laser, an LED or the like in two axial directions perpendicular to each other and a projection type display apparatus have been put to practical use. These optical scanning apparatuses are each configured to include a light source, and, for example, an actuator and its drive control apparatus as shown in FIG. 13.

The actuator is configured to include a reflective device that makes a reflecting part pivot in two operating axes perpendicular to each other, and driving parts that determine the drive frequencies of the reflecting part.

In particular, when drawing a trace by scanning a beam of light by Lissajous scanning, the trace and a period (hereinafter, referred to as a "Lissajous period") for which the trace returns to the former trace are determined by the drive frequencies of the axes. In a radar apparatus or a projection type display apparatus, a beam of light is required to pass over all pixels defined by a resolution or the like within a time defined by a frame rate or the like. For the above purpose, it is required to set the Lissajous period to an appropriate value and is set the drive frequencies so that the trace becomes as precise as possible.

In the actuator drive control apparatus of the first prior art shown in FIG. 13, the mesh count of the trace drawn by scanning a beam of light on the projection plane is preliminarily set in a predetermined range, the clock count of an oscillator 51 and the actual resonance frequencies of two operating axes (operating axes driven by a first movable part 54 a second movable part 55) of a scanner 53 obtained by resonance frequency setting means 52 are inputted to a drive frequency setting means 56, and drive frequencies of the highest operating efficiency are calculated. As prior art document information relevant to the invention of this application, for example, Patent Document 1 has been known.

Moreover, the optical scanning apparatus of a second prior art for use in a projection type display apparatus or the like is configured to include a mirror part that reflects a beam of light emitted from a light source, a first movable part that supports the mirror part by a first torsion bar inside a first frame, and a second movable part that supports the first movable part by a second torsion bar inside a second frame substantially perpendicular to the first torsion bar, by which the mirror part pivots around the two axes by a Coulomb force, a Lorentz force and a piezoelectric displacement applied to the first and second movable parts. As prior art document information relevant to the invention of this application, for example, Patent Document 2 has been known.

Prior Art Documents of patent documents related to the present invention are as follows:

Patent Document 1: Japanese patent laid-open publication No. JP 2004-302104 A; and Patent Document 2: Japanese patent No. JP 2722314.

In the actuator drive control apparatus of the first prior art acquires the drive frequencies with which the desired resolution is obtained in consideration of deviations in the actual resonance frequencies, and the resolution largely fluctuates depending on the frame rate in the case of Lissajous scanning.

Moreover, in the drive control apparatus of the second prior art, it is desirable to make the drive frequencies coincide with the resonance frequencies of the respective operating axes in order to improve the driving efficiency of the mirror part. However, since the actual resonance frequencies fluctuate depending on variations in shape in the manufacturing processes and environmental factors of ambient temperature changes and so on, it is required to correct the drive frequencies in consideration of these fluctuations.

SUMMARY OF THE INVENTION

An object of the present invention is to solve the aforementioned conventional problems and provide an optical scanning apparatus capable of obtaining high resolution by setting the drive frequencies so that the beam of light draws as precise trace as possible while considering the frame rate in an optical scanning apparatus that scans a beam of light by Lissajous drawing, and an optical reflection device used for the same optical scanning apparatus.

Another object of the present invention is to solve the aforementioned conventional problems and provide an optical scanning apparatus capable of improving the driving efficiency and obtaining high resolution as a consequence of a precise trace drawn by the beam of light in the optical scanning apparatus that performs in particular Lissajous drawing by resonant drive.

In order to achieve the above-mentioned objects, according to the first aspect of the present invention, there is provided an optical scanning apparatus including a light source that emits a beam of light, and a scanning device that scans the beam of light in two axial directions that are substantially perpendicular to each other at a first frequency $f_H$ and a second frequency $f_L$. The first frequency $f_H$ and the second frequency $f_L$ have relations determined according to following Mathematical Formulas 1 to 4 or following Mathematical Formulas 5 to 8:

$$f_H = N \times f_L \pm \frac{1}{2}\frac{(2a+1)f_L}{(2a+1)P-b}, \quad \text{[Mathematical Formula 1]}$$

$$a = 1, 2, 3, \ldots \text{ and } a_{max} = \left[\frac{1}{4}\left(\frac{f_L}{\frac{Fr}{2}} - 3\right)\right], \quad \text{[Mathematical Formula 2]}$$

$$b = \pm 1, \pm 2, \ldots, a, \text{ and} \quad \text{[Mathematical Formula 3]}$$

$$P = \left[\frac{1}{4(2a+1)}\left(\frac{f_L}{\frac{Fr}{2}} + 4b + 1\right)\right], \quad \text{[Mathematical Formula 4]}$$

in the Mathematical Formulas 1 to 4, "a" is an arbitrary integer having a maximum value $a_{max}$, N is a positive integer, Fr is a frame rate, [ ] represents a Gauss symbol, and a=b=0 is included as a special case:

$$f_H = N \times f_L \pm \frac{2af_L}{4aP-(2b+1)}, \quad \text{[Mathematical Formula 5]}$$

$$a = 1, 2, 3, \ldots \text{ and } a_{max} = \left[\frac{1}{4}\left(\frac{f_L}{\frac{Fr}{2}} - 1\right)\right], \quad \text{[Mathematical Formula 6]}$$

$$b = -a, -a+1, \ldots, a-1, \text{ and} \quad \text{[Mathematical Formula 7]}$$

$$P = \left[\frac{1}{4(2a)}\left(\frac{f_L}{\frac{Fr}{2}} + 4b + 3\right)\right],$$ [Mathematical Formula 8]

in the Mathematical Formulas 5 to 8, "a" is an arbitrary integer having a maximum value $a_{max}$, "b" is an integer within a range of −a to a−1, N is a positive even number, Fr is the frame rate, and [ ] represents the Gauss symbol.

In the above-mentioned optical scanning apparatus, the scanning device scans the beam of light by using a sine wave.

In addition, in the above-mentioned optical scanning apparatus, the scanning device includes an optical reflection device and a control part. The optical reflection device includes a reflecting part that reflects the beam of light and a driving part that pivots the reflecting part around two axes substantially perpendicular to each other. The control part controls the optical reflection device.

Further, in the above-mentioned optical scanning apparatus, the scanning device includes first and second reflection devices, and a control part. The first optical reflection device includes a first reflecting part, and a first driving part that pivots the first reflecting part around a first axis. The second optical reflection device includes a second reflecting part and a second driving part that pivots the second reflecting part around a second axis. The control part controls the first and second optical reflection devices. The beam of light is reflected sequentially to the first reflecting part and the second reflecting part, and the first axis and the second axis are arranged to be substantially perpendicular to each other.

According to the second aspect of the present invention, there is provided an optical reflection device for use in an optical scanning apparatus, where the optical scanning apparatus includes an optical reflection device and a control part. The optical reflection device includes a reflecting part that reflects a beam of light and a driving part that pivots the reflecting part around two axes substantially perpendicular to each other. The control part controls the optical reflection device. The optical reflection device includes first and second drive systems. The first drive system includes a first driving part that pivots the reflecting part around a first axis. The second drive system includes a second driving part that pivots the first drive system around a second axis perpendicular to the first axis. When a resonance frequency of the first drive system is $f_H$ and a resonance frequency of the second drive system is $f_L$, then the resonance frequencies $f_H$ and $f_L$ have relations determined according to following Mathematical Formulas 9 to 12 or following Mathematical Formulas 13 to 16:

$$f_H = N \times f_L \pm \frac{1}{2} \frac{(2a+1)f_L}{(2a+1)P - b},$$ [Mathematical Formula 9]

$$a = 1, 2, 3, \ldots \text{ and } a_{max} = \left[\frac{1}{4}\left(\frac{f_L}{\frac{Fr}{2}} - 3\right)\right],$$ [Mathematical Formula 10]

$b = \pm 1, \pm 2, \ldots, a$, and [Mathematical Formula 11]

$$P = \left[\frac{1}{4(2a+1)}\left(\frac{f_L}{\frac{Fr}{2}} + 4b + 1\right)\right],$$ [Mathematical Formula 12]

in the Mathematical Formulas 9 to 12, "a" is an arbitrary integer having a maximum value $a_{max}$, N is a positive integer, Fr is a frame rate, [ ] represents a Gauss symbol, and a=b=0 is included as a special case, $$f_H = N \times f_L \pm \frac{2af_L}{4aP - (2b+1)},$$ [Mathematical Formula 13]

$$a = 1, 2, 3, \ldots \text{ and } a_{max} = \left[\frac{1}{4}\left(\frac{f_L}{\frac{Fr}{2}} - 1\right)\right],$$ [Mathematical Formula 14]

$b = -a, -a+1, \ldots, a-1$, and [Mathematical Formula 15]

$$P = \left[\frac{1}{4(2a)}\left(\frac{f_L}{\frac{Fr}{2}} + 4b + 3\right)\right],$$ [Mathematical Formula 16]

in the Mathematical Formulas 13 to 16, "a" is an arbitrary integer having a maximum value $a_{max}$, "b" is an integer within a range of −a to a−1, N is a positive even number, Fr is the frame rate, and [ ] represents the Gauss symbol.

According to the third aspect of the present invention, there is provided an optical scanning apparatus including a light source, an optical reflection device, and a control device. The light source emits a beam of light, the optical reflection device scans the beam of light around first and second axes that are mutually substantially perpendicular, and the control part controls the optical reflection device. The optical reflection device includes the first and second drive systems. The first drive system includes a mirror part, and a first driving part that pivots the mirror part around a first axis. The second drive system includes the first drive system, and a second driving part that pivots the first drive system around a second axis that is substantially perpendicular to the first axis. When a resonance frequency of the first drive system is $f_Y$, and a resonance frequency of the second drive system is $f_X$, then the control part calculates a relational expression of $f_H$ and $f_L$ by using following Mathematical Formulas 17 to 20 or following Mathematical Formulas 21 to 24, thereafter obtains with $f_L' = f_H = f_Y$ in the relational expression, and sets $f_H$ and $f_L'$ to the drive frequency of the first driving part and the drive frequency of the second driving part, respectively:

$$f_H = N \times f_L \pm \frac{1}{2} \frac{(2a+1)f_L}{(2a+1)P - b},$$ [Mathematical Formula 17]

$$a = 1, 2, 3, \ldots \text{ and } a_{max} = \left[\frac{1}{4}\left(\frac{f_L}{\frac{Fr}{2}} - 3\right)\right],$$ [Mathematical Formula 18]

$b = \pm 1, \pm 2, \ldots, a$, and [Mathematical Formula 19]

$$P = \left[\frac{1}{4(2a+1)}\left(\frac{f_L}{\frac{Fr}{2}} + 4b + 1\right)\right],$$ [Mathematical Formula 20]

in the Mathematical Formulas 17 to 20,
"a" is an arbitrary integer having a maximum value $a_{max}$,
N is a positive integer,
Fr is a frame rate, and
[ ] represents a Gauss symbol, $$f_H = N \times f_L \pm \frac{2af_L}{4aP - (2b+1)},$$ [Mathematical Formula 21]

$$a = 1, 2, 3, \ldots \text{ and } a_{max} = \left[\frac{1}{4}\left(\frac{f_L}{\frac{Fr}{2}} - 1\right)\right],$$ [Mathematical Formula 22]

$b = -a, -a+1, \ldots, a-1$, and [Mathematical Formula 23]

-continued $$P = \left[\frac{1}{4(2a)}\left(\frac{f_L}{\frac{Fr}{2}} + 4b + 3\right)\right],$$ [Mathematical Formula 24]

in the Mathematical Formulas 21 to 24,
"a" is an arbitrary integer having a maximum value $a_{max}$,
"b" is an integer within a range of $-a$ to $a-1$,
N is a positive integer,
Fr is the frame rate, and
[ ] represents the Gauss symbol.

As described above, according to the present invention, the drive conditions can be simply calculated so that the beam of light can draw as precise trace as possible within the desired frame rate, and therefore, a projection type display apparatus with higher resolution can be actualized at lower cost.

Moreover, according to the present invention, the drive frequencies can be calculated so that the scanning lines can draw as precise trace as possible within the desired frame rate. Furthermore, since the calculation of the drive frequencies is simple, the drive frequencies can be occasionally appropriately set again even when the resonance frequency fluctuates due to individual differences in the resonance frequencies and the external environment in order to maintain a high driving efficiency in the case where the resonance drive is utilized.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
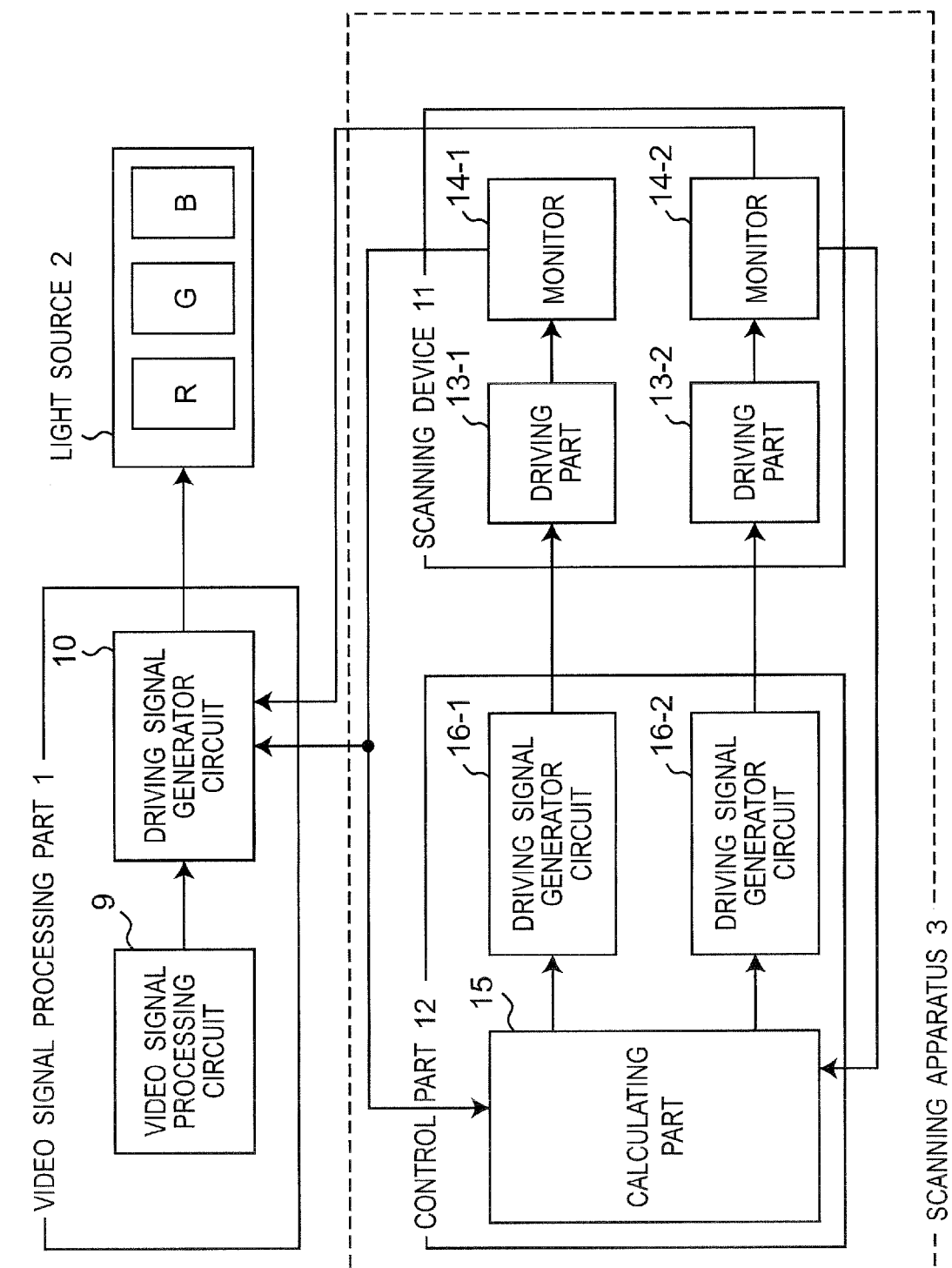
FIG. 1 is a block diagram showing a configuration of an optical scanning apparatus according to one preferred embodiment of the present invention.

Preferred embodiments of the present invention will be described below with reference to the drawings. In the following preferred embodiments, like components are denoted by like reference numerals.

Description of Overall Configuration

FIG. 1 is a block diagram showing a configuration of an optical scanning apparatus according to one preferred embodiment of the present invention. The optical scanning apparatus of the present preferred embodiment is configured roughly to include a light source 2, and a scanning apparatus 3. The light source 2 is configured to include a light-emitting device configured to include an LD (Laser Diode), an LED (Light Emitting Diode) or the like, which emits a beam of light at the wavelength of R (red), G (green), B (blue) or the like selected arbitrarily according to an application. The light source 2 is connected to a video signal processing part 1 that includes a video signal processing circuit 9 to generate a video signal, and a driving signal generator circuit 10 to modulate the intensity of the beam of the light source 2.

On the other hand, the scanning apparatus 3 is configured to include at least a scanning device 11 for scanning the light source 2 on a straight line, a curve or a plane, and a control part 12 for controlling the driving of the scanning device 11. The scanning device 11 may directly scan the light source 2 by using, for example, an actuator or scan a beam of light emitted from a fixed position by reflection using an optical reflection device such as a mirror device. The scanning device 11 has driving parts 13-1 and 13-2 corresponding to the number of axes to be driven, and monitors 14-1 and 14-2 for detecting the operating states of the driving parts 13-1 and 13-2.

The control part 12 calculates the drive conditions of the scanning device 11 and generate an actual driving signal, and is configured to include a calculating part 15 and driving signal generator circuits 16-1 and 16-2. The calculating part 15 calculates the drive conditions (frequency, amplitude and phase) of the scanning device 11 from the resonance frequencies of the driving parts 13-1 and 13-2 in the scanning device 11 and preliminarily obtained characteristics of the scanning device 11 and the like, and outputs the results to the driving signal generator circuits 16-1 and 16-2. In the calculating part 15, by using the Mathematical Formulas (1) to (16) to calculate the high-speed side frequency $f_H$ and the low-speed side frequency $f_L$ that are the points of the present invention, appropriate drive frequencies can be determined so as to draw as precise trace as possible. In the driving signal generator circuits 16-1 and 16-2, signals of voltage, phase, frequency and the like for actually driving the scanning device 11 are generated from the results of the calculating part 15, and the driving parts 13-1 and 13-2 are operated. By arbitrarily calculating the drive conditions by feedback of driving signals detected from the monitors 14-1 and 14-2 to the calculating part 15, a decrease in the driving efficiency of the scanning device 11 due to environmental changes in temperature and vibrations and the deviation in the resonance frequency is suppressed within a definite range. A precise trace can be kept by maintaining the appropriate drive frequencies. The signals from the monitors 14-1 and 14-2 are also outputted to the driving signal generator circuit 10 that controls the light source 2, and the intensity of the beam of the light source 2 is also controlled in accordance with the actual operation of the scanning device 11. Although the above is one example in which the monitors 14-1 and 14-2 are provided directly for the scanning device 11, the monitors may be provided for an external apparatus so long as the operation of the scanning device 11 can be detected from the external apparatus. For example, it is acceptable to use an optical device such as a PD (Photo Diode) that directly detects a beam of light or a charge coupled device such as a CCD (Charge Coupled Device).

Figure 2:
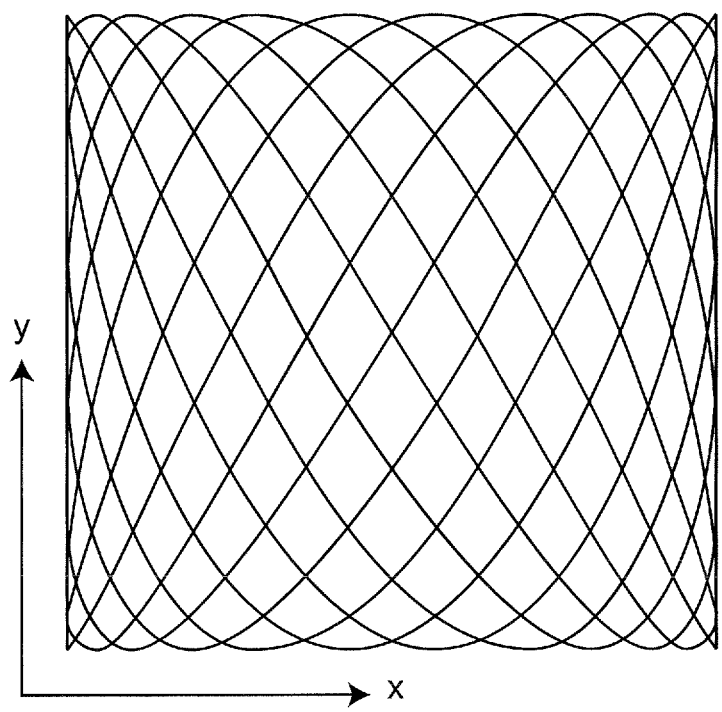
FIG. 2 is a figure showing one example of the trace drawn by the optical scanning apparatus of FIG. 1.

By scanning a beam of light around the two axes that are substantially perpendicular to each other by a sine wave as described above, the beam of light of the optical scanning apparatus according to the preferred embodiment of the present invention draws the Lissajous pattern shown in FIG. 2. The Lissajous pattern depends largely on the frequency of the sine wave, and the trace and density of the beam of light drawn within the time of the frame rate variously change. When the optical scanning apparatus of the preferred embodiment of the present invention is applied to a projection type display apparatus, it is sometimes the case where the desired resolution cannot be obtained or flicker increases depending on the drive conditions. The preferred embodiment of the present invention is to provide a high-resolution optical scanning apparatus such that the trace of the beam of light becomes as precise as possible in consideration of the frame rate.

Description of Optical Reflection Device

The scanning device for use in the present invention, and in particular, one preferred embodiment of the optical reflection device is described next.

Figure 3:
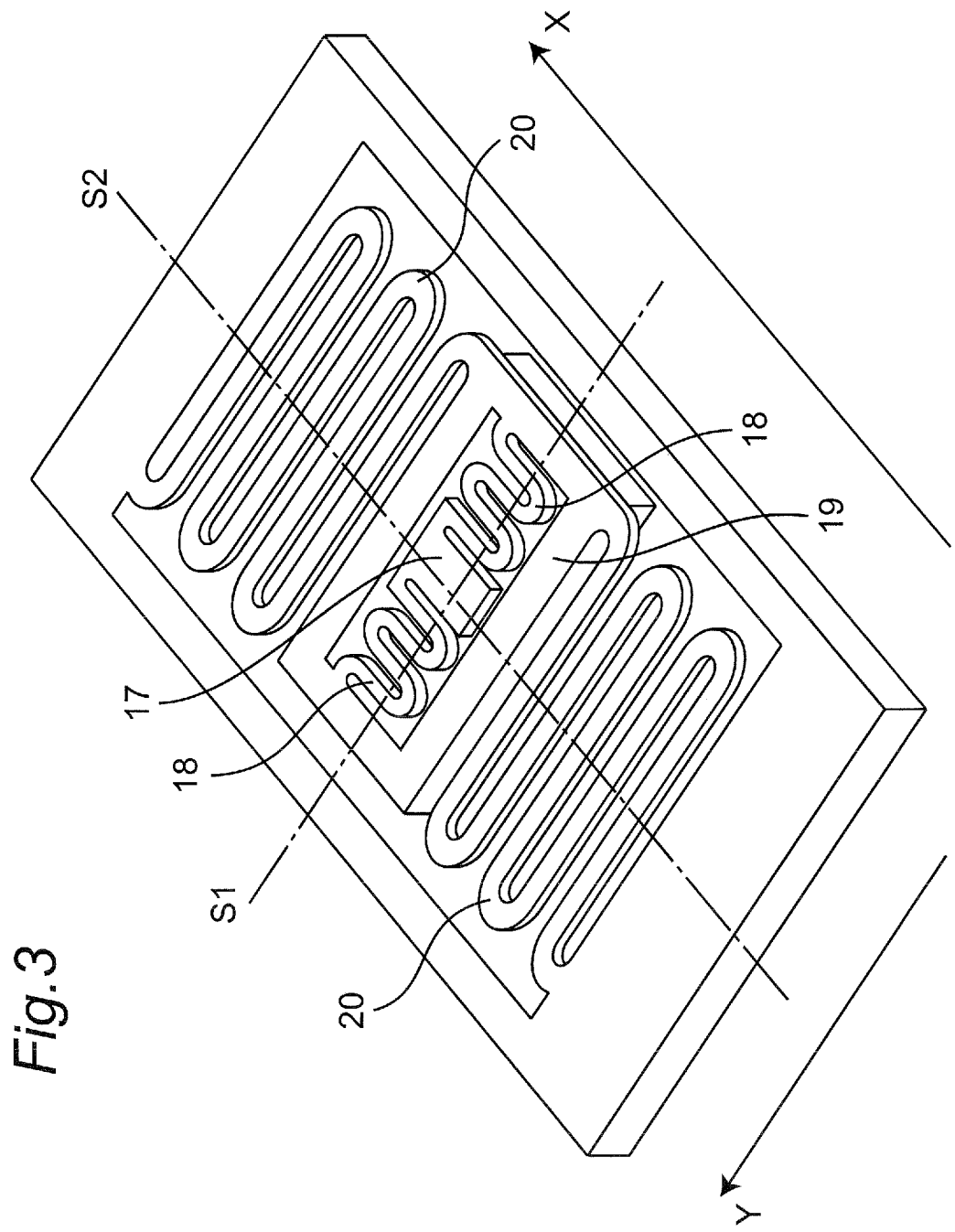
FIG. 3 is a perspective view showing one example of the optical reflection device for use in the optical scanning apparatus of FIG. 1.

FIG. 3 is a perspective view of an optical reflection device in one preferred embodiment of the present invention. The optical reflection device 3 shown in FIG. 3 is an optical reflection device of the so-called meander shape, and is configured to include a reflecting part 17 that reflects the beam of light from the light source to a center portion, and a first driving part 18 that pivots the reflecting part 17 around a first axis S1. Further, the optical reflection device 3 further includes a second drive system including a second driving part 20 that pivots the first frame 19 including the first drive system around a second axis S2 substantially perpendicular to the first axis S1.

The first driving part 18 and the second driving part 20 have the so-called meander shape such that a beam made of silicon or the like is folded a plurality of times every definite length. A piezoelectric body, which is vertically interposed between electrodes, is fanned on the beam. By applying a voltage between the electrodes at a definite frequency, the first drive system pivots around the first axis S1, and the second drive system pivots around the second axis S2. Moreover, by providing a plurality of piezoelectric bodies independently on beams, it is possible to detect electric charges generated when the first and second driving parts 18 and 20 are operated, and use the piezoelectric bodies as the monitors 14-1 and 14-2 (FIG. 1) to detect the operating state.

The reason why the beam has the meander shape is to increase the displacement magnitude (pivot angle in the case of the present preferred embodiment) by superimposing the displacement of the piezoelectric body, and to obtain the effect of substantially lengthening the beam. The first and second driving parts 18 and 20 correspond to the driving parts of the scanning device 11 (FIG. 1).

In order to improve the driving efficiency of the optical reflection device, the resonance frequencies of the drive systems become important. That is, a maximum driving efficiency can be obtained by making the drive frequencies coincide with the resonance frequencies of the first and second drive systems.

Although FIG. 3 is one example of the optical reflection device capable of performing dual-axis driving with one device, similar effects can be obtained even when two single-axis drive optical reflection devices are arranged with their axes perpendicular to each other, and the beam of light is reflected a plurality of times.

A manufacturing method for use in the optical reflection device is simply described next.

A SOI (Silicon on Insulator) substrate is used as a substrate. In the present case, a substrate having a base portion thickness of 475 μm, an embedded oxide film thickness of 1 μm and an active layer thickness of 100 μm was used. First of all, a silicon oxide film is formed as an insulation film on the substrate. Then, a lower electrode is formed on the silicon oxide film by the sputtering method or the like. Subsequently, a piezoelectric thin film of, for example, PZT is formed as a driving source on the lower electrode by the sputtering method or the like. Further, a metal film of titanium/gold or the like that serves as an upper electrode is formed on the piezoelectric thin film. In the present preferred embodiment, one example was formed by layering platinum that serves as the lower electrode in a thickness of 0.2 μm, a piezoelectric body in a thickness of 3.5 μm, titanium of the upper electrode in a thickness of 0.01 μm, and gold in a thickness of 0.3 μm.

Next, the desired electrode pattern and piezoelectric body configuration are formed by repeating patterning by photolithography of the lower electrode, the piezoelectric body and the upper electrode, and processing by wet etching, dry etching or the like.

Subsequently, meander type vibrators that serve as the first and second driving parts are formed by processing the active layer of the SOI substrate by the patterning and etching techniques of photolithography. At this time, by using Bosch process or the like as an etching method, vertical processing of a high aspect ratio becomes possible, and device size reduction can be achieved.

Next, by protecting the device surface with a protective film such as a resist or the like capable of being easily removed afterward, thereafter similarly performing processing by the patterning and etching techniques by photolithography from the reverse surface side of the substrate, and finally removing the protective film, an optical reflection device for use in the present invention can be produced.

Description of Driving Method

A method for determining the drive frequencies of the axes in the scanning apparatus 3, which is the point of the present invention, is described next.

A case where a projection type display apparatus is configured by using the optical scanning apparatus of the present preferred embodiment and a screen is described. When the diameter of the beam of light on the screen is sufficiently small, the resolution of the projected image is determined by the trace (scanning lines) of the beam of light. As described above, when the optical reflection device is used as a scanning device, the reflecting part of the scanning device vibrates in a sinusoidal shape around the pivot axes, drawing a Lissajous pattern. When substantially mutually perpendicular two axes are the x-axis and the y-axis, respectively, the traces of the beam of light in the respective axes can be expressed by the following Equations (1) with the x coordinate and the y coordinate as the functions of time t:

$$x = A \sin(2\pi f_L t + \phi)$$

$$y = B \sin(2\lambda f_H t + \psi) \quad (1).$$

In this case, $f_L$ represents a drive frequency around the x-axis (corresponding to the drive frequency of the second drive system in the optical reflection device of FIG. 3), $f_H$ represents a drive frequency around the y-axis (corresponding to the drive frequency of the first drive system in the optical reflection device of FIG. 3), A and B represent amplitudes, and $\phi$ and $\psi$ represent the phase shifting of the respective axes. The region where the trace expressed as above is drawable on the screen is the limit of resolution, and when the number of sheets of images displayed in one second is Fr, the region drawable for 1/Fr seconds becomes the substantial resolution.

Figure 4A:
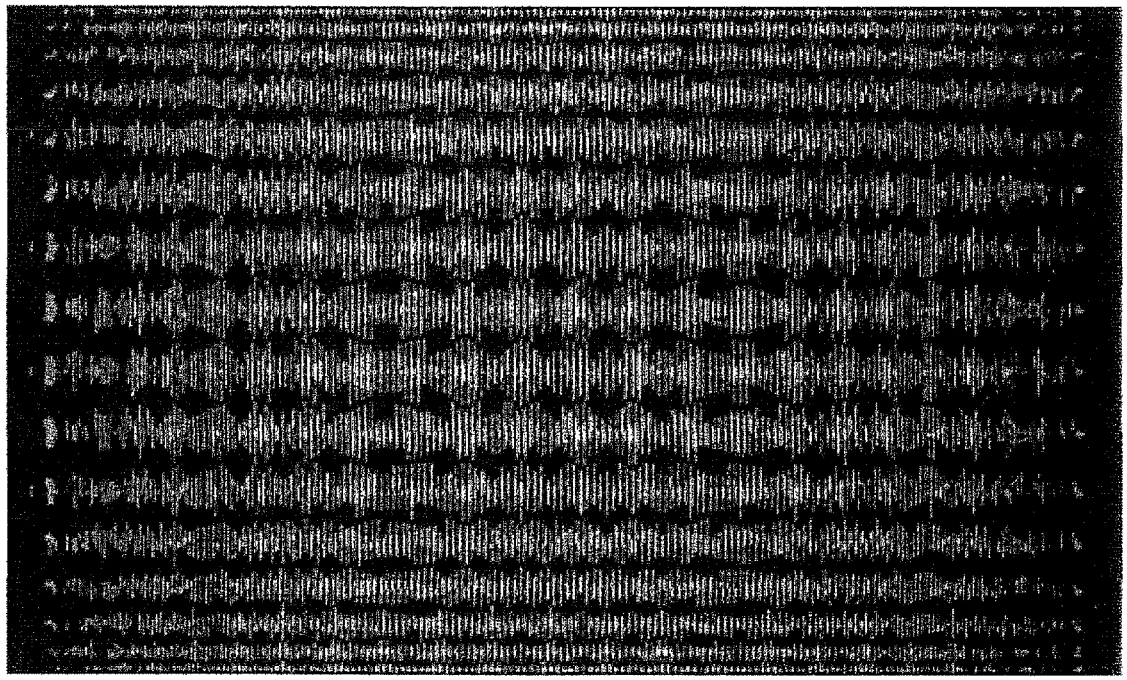
FIG. 4A is a graphical figure showing a first example of the trace drawn by the optical scanning apparatus of FIG. 1.
Figure 4B:
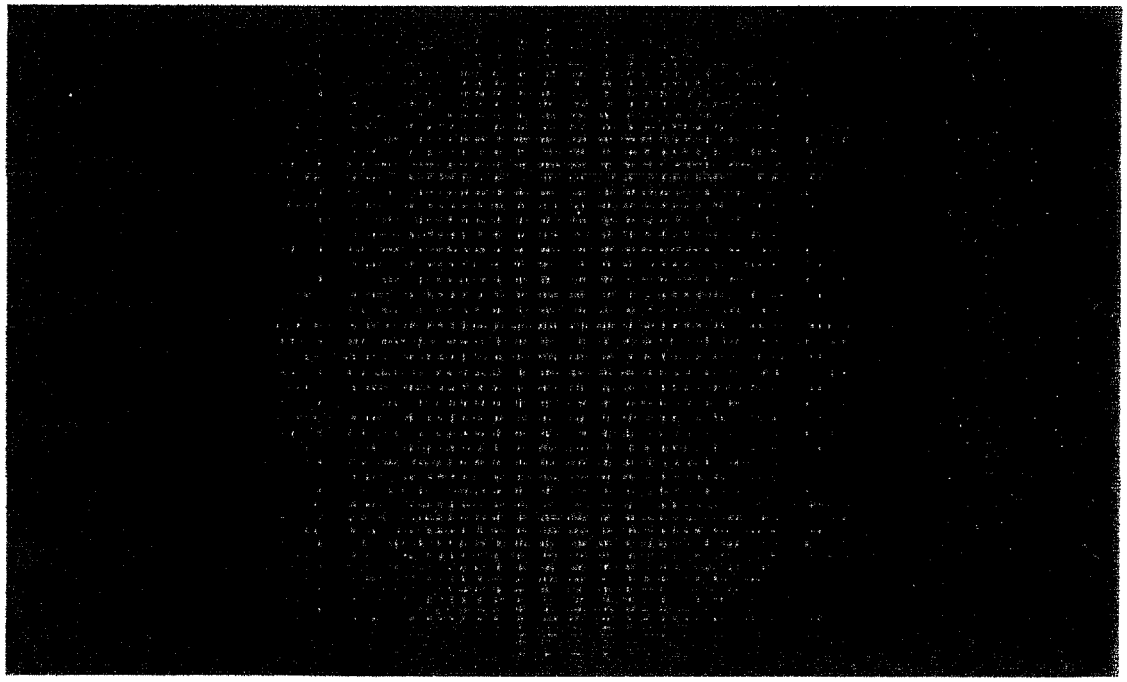
FIG. 4B is a graphical figure showing a second example of the trace drawn by the optical scanning apparatus of FIG. 1.

If one example is taken, when the drive frequency $f_H$ around the y-axis is 31530 Hz and the drive frequency $f_L$ around the x-axis is 1000 Hz, the trace shown in FIG. 4A results. This means that only about 82% of the drawing area that has 800×480 pixels can be drawn for 1/30 seconds when the frame rate is assumed to be 30 fps. When the drive frequency $f_L$ around the x-axis is set to 1020 Hz with the frequency $f_H$ around the y-axis kept intact, the trace shown in FIG. 4B results, and 98% of the drawing area of 800×480 pixels can be drawn for the same 1/30 seconds.

As described above, the traces of the beam of light have a close relation to the drive frequencies $f_L$ and $f_H$, and it is required to set these drive frequencies $f_L$ and $f_H$ to optimal values in order to display an image with high resolution. In particular when the scanning device is driven in the neighborhood of the resonance frequency, variations also occur in the resonance frequency due to variations in manufacturing and the like, and therefore, it is required to set an appropriate drive frequency for each device. Although it is driven at a low frequency around the x-axis and at a higher frequency around the y-axis than that of the x-axis in the above example, there is no essential change even if the x-axis and the y-axis are exchanged.

Derivation Method of Mathematical Formulas (1) to (4)

Derivation methods of the Mathematical formulas (1) to (4) are described next.

When initial phase differences $\phi$ and $\psi$ are each zero in the Mathematical Formula (17), the time for which the trace of beam of light passes on the y-axis where x=0 in the image is x(t)=0, and therefore, is expressed by the following equation:

$$2\pi f_L t_n = n\pi \quad (2).$$

In this case, n=0, 1, 2, . . . . The upper limit of n is determined by the frame rate Fr, and expressed by the following equation using the Gauss symbol [ ]. In this case, a Gauss symbol [X] is a function representing the maximum integer that does not exceed X:

$$n_{max} = \left[\frac{2f_L}{Fr}\right]. \quad (3)$$

That is, the timing when the trace intersects the y-axis can be expressed by the following equation:

$$t_n = \frac{n}{2f_L}. \quad (4)$$

In this case, n=0, 1, 2, . . . , $[2f_L/Fr]$. Considering the phase θn at the intersection with the y-axis at the time, the phase can be expressed by the following equation:

$$\theta_n = 2\pi f_H t_n = n\pi \frac{f_H}{f_L}. \quad (5)$$

In this case, θn is represented by only a residual obtained when dividing original θn by 2π. That is, θn is represented by λ in a case where $\theta_n = 3\pi$. In this case, when $f_H = Nf_L \pm f$ (N: integer, $0 \le f < f_L$), θn is expressed by the following equation:

$$\theta_n = n\pi\left(N \pm \frac{f}{f_L}\right). \quad (6)$$

The above Equation (6) is expressed by the following equation when N is an even number:

$$\theta_n = \pm n\pi \frac{f}{f_L}. \quad (7)$$

When N is an odd number, it is expressed by the following two Equations:

$$\theta_{2q} = \pm 2q\pi \frac{f}{f_L}, \text{ and} \quad (8)$$

$$\theta_{2q+1} = \pm\left\{\pi + (2q+1)\frac{f}{f_L}\right\}. \quad (9)$$

In this case, to achieve high resolution, i.e., to scan the whole screen without bias, it is desirable to distribute the phase $\theta_n$ for the interval [0, 2π] uniformly without any overlap. For the above purpose, it is required to distribute the phase $\theta_n$ for the interval [0, 2π] uniformly without any overlap, and the conditions therefor are considered as follows case by case.

Case 1

First of all, a case where N is an odd number and the sign is plus is considered. In this case, in a manner similar to that of the Equations (8) and (9), an increment when q is increased by one is $2\pi f/f_L$ in each of $\theta_{2q}$ and $\theta_{2q+1}$.

Figure 5A:
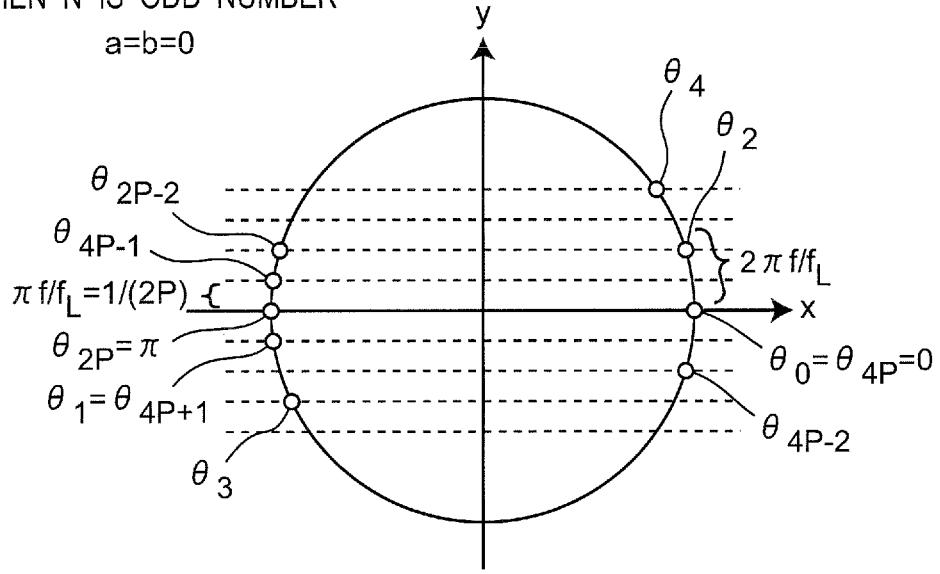
FIG. 5A is a characteristic diagram for explaining the deriving process of a calculating expression to calculate drive conditions of the optical scanning apparatus of FIG. 1.

Regarding the distribution manner of the phase $\theta_n$, it is herein considered that "$\theta_{2q}$ and $\theta_{2q+1}$ make almost one circuit for the interval of [0, 2π] so that $\theta_{2P} = \pi$ with regard to a certain natural number P while 2q and 2q+1 become $n_{max}$". The phase $\theta_n$ is uniformly distributed at intervals of $\pi f/f_L$. The distribution state of the phase $\theta_n$ in this case is shown in FIG. 5A. Since $\theta_{2P} = \pi$, the following two relational expressions hold:

$\theta_{2P-2} < \theta_{4P-1} < \theta_{2P} = \pi < \theta_1 = \theta_{4P+1} < \theta_{2P+2}$ (Relational Expression 1), and $\theta_{4P-2} < \theta_{2P-1} < \theta_0 = \theta_{4P} = 0 < \theta_{2P+1} < \theta_{4P+2}$ (Relational Expression 2).

In order that "$\theta_{2q}$ and $\theta_{2q+1}$ make almost one circuit for the interval of $[0, 2\pi]$ while $2q$ and $2q+1$ become $n_{max}$", $n_{max}$ is any one of 4P−1, 4P, 4P+1 and 4P+2. In each case, the following equation is obtained from the Equation (3):

$$\left[\frac{1}{4}\left(\frac{f_L}{Fr/2} + 1\right)\right] = P. \quad (10)$$

According to the Equation (10), the Equation (8) and $\theta_{2P}=\pi$, the phase $\theta_{2P}$ is expressed by the following equation:

$$\theta_{2P} = 2P\pi\frac{f}{f_L} = 2\pi. \quad (11)$$

Therefore, $f=f_L/2P$. The same thing can be said for the case where the sign is minus, since $f_H=Nf_L\pm f$ (N: integer, $0 \le f < f_L$), the high-speed side frequency $f_H$ is expressed by the following equation:

$$f_H = Nf_L \pm \frac{f_L}{2\left[\frac{1}{4}\left(\frac{f_L}{Fr/2} + 1\right)\right]}. \quad (12)$$

Figure 5B:
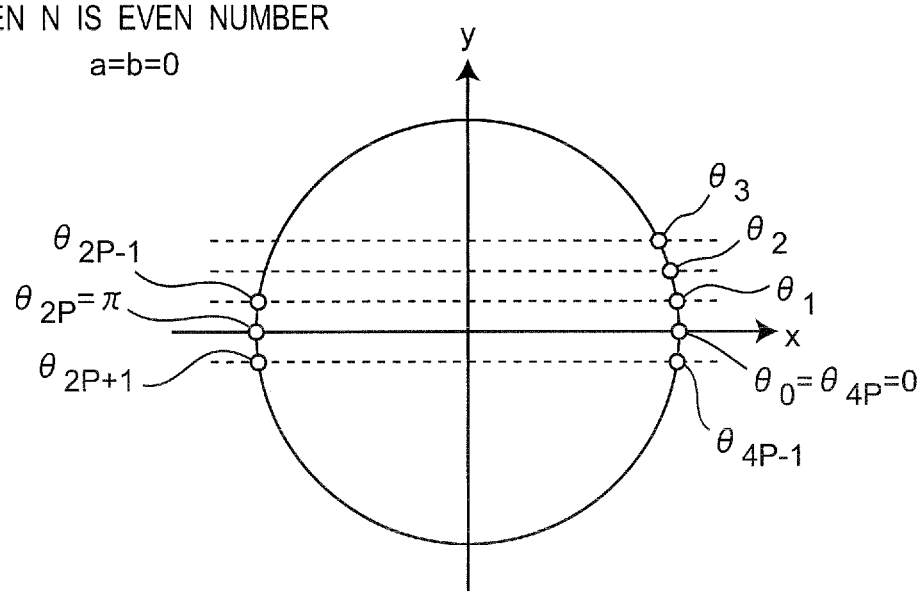
FIG. 5B is a characteristic diagram for explaining the deriving process of a calculating expression to calculate the drive conditions of the optical scanning apparatus of the present invention.

Moreover, in the case where N is an even number, an increment when n is increased by one from the Equation (7) is $\pi f/f_L$. If the Equation (12) and the phase $\theta_{2P}=\pi$ are satisfied, the phase $\theta_n$ can be similarly distributed uniformly without any overlap for the interval $[0, 2\pi]$ also in the case where N is an even number. The distribution state in this case is shown in FIG. 5B.

Case 2

First of all, a case where N is an odd number and the sign is plus is considered. In this case, in a manner similar to that of the Equations (8) and (9), an increment when q is increased by one is $2\pi f/f_L$ in each of the phase $\theta_{2q}$ and the phase $\theta_{2q+1}$.

Figure 6A:
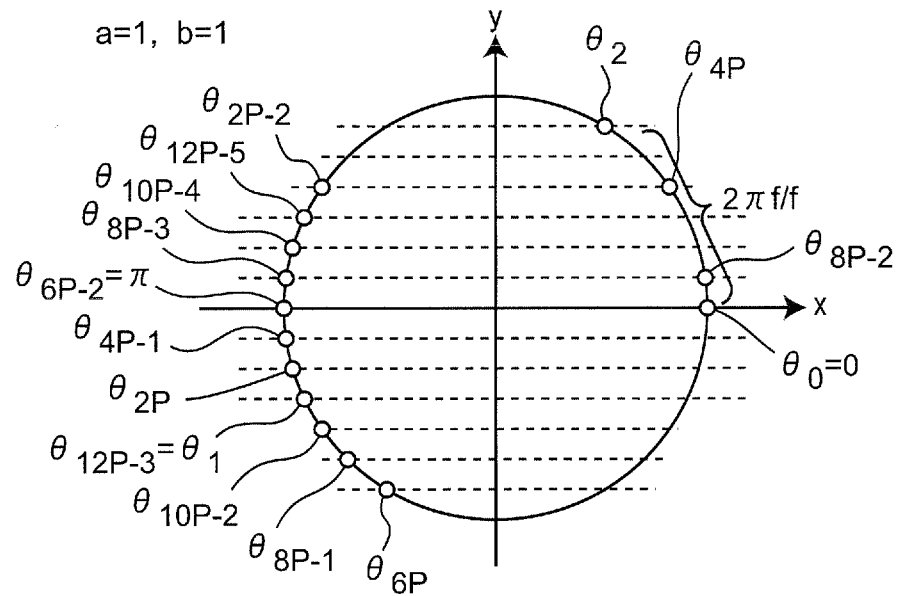
FIG. 6A is a characteristic diagram for explaining the deriving process of a calculating expression to calculate the drive conditions of the optical scanning apparatus of FIG. 1.

Regarding the distribution of the phase $\theta_n$, it is herein considered that "$\theta_{2q}$ and $\theta_{2q+1}$ make almost three circuits for the interval of $[0, 2\pi]$ so that $\theta_{2P}$ satisfies $\theta_{2P}=\pi+2f\pi/3f_L$ with regard to a certain natural number P while $2q$ and $2q+1$ become $n_{max}$". The phase $\theta_n$ is uniformly distributed at intervals of $\pi f/3f_L$. The distribution manner is shown in FIG. 6A.

In this case, $\theta_{2P}=2f\pi/3f_L$, and therefore, $\theta_{6P-2}$ can be expressed by the following equation:

$$\theta_{6P-2} = 3\pi + 2\frac{f}{f_L}\pi - 2\frac{f}{f_L}\pi = \pi. \quad (13)$$

By similar consideration, the distribution of the phase $\theta_n$ satisfies the following relational expressions:

$\theta_{2P-2} < \theta_{12P-5} < \theta_{10P-4} < \theta_{8P-3} < \theta_{6P-2} =$ (Relational Expression 3)
$\pi < \theta_{4P-1} < \theta_{2P} < \theta_1 = \theta_{12P-3} < \theta_{10P-2} <$
$\theta_{8P-1} < \theta_{6P} < \theta_{4P+1} < \theta_{2P+2}$,
and $\theta_{12P-6} < \theta_{10P-5} < \theta_{8P-4} <$ (Relational Expression 4)
$\theta_{6P-2} < \theta_{4P-2} < \theta_{2P-1} < \theta_0 =$
$\theta_{12P-4} = 0 < \theta_{10P-3} < \theta_{8P-2} < \theta_{6P-1} <$
$\theta_{4P} < \theta_{2P+1} < \theta_2 < \theta_{12P-2}$.

In order that $\theta_{2q}$ and $\theta_{2q+1}$ make almost three circuits for the interval of $[0, 2\lambda]$ while $2q$ and $2q+1$ become $n_{max}$, $n_{max}$ is any one of 12P−5, and 12P−4, ..., 12P+6. In each case, the following equation can be expressed according to the Equation (3):

$$\left[\frac{1}{12}\left(\frac{f_L}{Fr/2} + 5\right)\right] = P. \quad (14)$$

The following equation can be obtained according to the Equation (14), the Equation (8) and the relational expression $\theta_{2P}=\pi+2f\pi/3f_L$ of the phase:

$$\theta_{2P} = 2P\pi\frac{f}{f_L} = \pi + \frac{2f}{3f_L}\pi. \quad (15)$$

Therefore, the frequency f is obtained by the following equation:

$$f = \frac{f_L}{2P - \frac{2}{3}}. \quad (16)$$

The same thing can be said for the case where the sign is minus, and therefore, the high-speed side frequency $f_H$ can be obtained according to the Equation (16) and $f_H=Nf_L\pm f$ (N: integer, $0 \le f < f_L$) by the following equation:

$$f_H = Nf_L \pm \frac{f_L}{2\left[\frac{1}{12}\left(\frac{f_L}{Fr/2} + 5\right)\right] - \frac{2}{3}}. \quad (17)$$

Figure 6B:
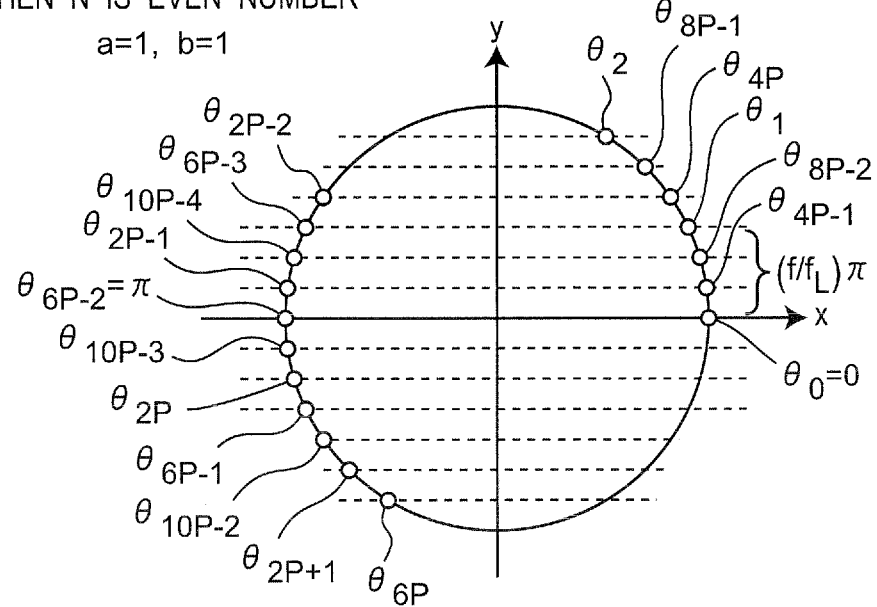
FIG. 6B is a characteristic diagram for explaining the deriving process of a calculating expression to calculate the drive conditions of the optical scanning apparatus of FIG. 1.

Moreover, in the case where N is an even number, a variation when n is increased by one from the Equation (7) is $f\pi/f_L$. If the Equation (14) and $\theta_{2P}=\pi+2\pi/3f_L$ are satisfied, $\theta_n$ can be similarly distributed uniformly without any overlap for the interval $[0, 2\pi]$ even in the case where N is an even number. The distribution state in this case is shown in FIG. 6B.

The above can be expanded as follows when generalized:

$$\theta_{2P} = \pm\left(1 + \frac{2b}{2a+1}\frac{f}{f_L}\right)\pi. \quad (18)$$

It is assumed that the Equation (18) could be set so as to be satisfied with respect to a certain positive integer P. In this case, the phase at the intersection with the y-axis can be expressed by the following equations:

$$\theta_{4P} = \pm 2\pi \pm \pi\frac{4b}{2a+1}\frac{f}{f_L} = \pm\pi\frac{4b}{2a+1}\frac{f}{f_L}, \quad (19)$$

-continued $$\theta_{4(2a+1)P} = \pm 4b\pi \frac{f}{f_L}, \quad (20)$$

and $$\theta_{4(2a+1)P-4b} = \pm 4b\pi \mp 4b\pi \frac{f}{f_L} = 0. \quad (21)$$

This means that the phase $\theta_n$ almost returns to the former state when rotated by $2a+1$ turns. According to the Equation (19) to the Equation (21), P can be obtained as follows:

$$P = \left[\frac{1}{4(2a+1)}\left(\frac{f_L}{Fr/2} + 4b + 1\right)\right]. \quad (22)$$

The frequency f can be obtained as follows according to the Equation (6) and the Equation (18):

$$f = \frac{f_L}{2P - \frac{2b}{2a+1}}. \quad (23)$$

The high-speed side frequency $f_H$ can be obtained by the following equation according to the Equation (22), the Equation (23) and the high-speed side frequency $f_H = Nf_L \pm f$ (N: integer, $0 \le f < f_L$):

$$f_H = Nf_L \pm f = Nf_L \pm \frac{1}{2}\frac{(2a+1)f_L}{(2a+1)P-b}. \quad (24)$$

In this case, $a=1, 2, 3, \ldots, a_{max}$, $b=\pm 1, \pm 2, \ldots, \pm a$, and the maximum value $a_{max}$ of "a" can be obtained by substituting $b=a$ into the Equation (22) under the condition that P of the Equation (22) is a positive integer, and it can be expressed by the following equation:

$$a_{max} = \left[\frac{1}{4}\left(\frac{f_L}{Fr/2} - 3\right)\right]. \quad (25)$$

In this case, $a=b=0$ may hold as a special case.

In the Equation (25), $a=b=0$ holds in the aforementioned "Case 1", and $a=1$ and $b=1$ hold in the aforementioned "Case 2".

In this case, $(2a+1)/((2a+1)P-b)$ should desirably be an irreducible fraction. This is because overlap occurs in the phase $\theta_n$ when $(2a+1)/((2a+1)P-b)$ is not the irreducible fraction, and high resolution cannot be obtained.

Moreover, the frequency that the trace intersects with the y-axis in the frame rate Fr is $n_{max}+1$. The number of the cases where intersections with the y-axis differ from intersections of the trace of combinations of the high-speed side frequency $f_H$ and the low-speed side frequency $f_L$ with the y-axis is $4(2a+1)P-4b$. A ratio of $4(2a+1)P-4b$ to $n_{max}+1$ should desirably be not smaller than 0.6. This is because the overlap of $\theta_n$ is increased when the ratio becomes smaller than 0.6.

Derivation Methods of the Mathematical Formulas (5) to (8) of Present Invention

Derivation methods of the Mathematical Formulas (5) to (8) of the present invention are described next.

Case 3

Figure 7:
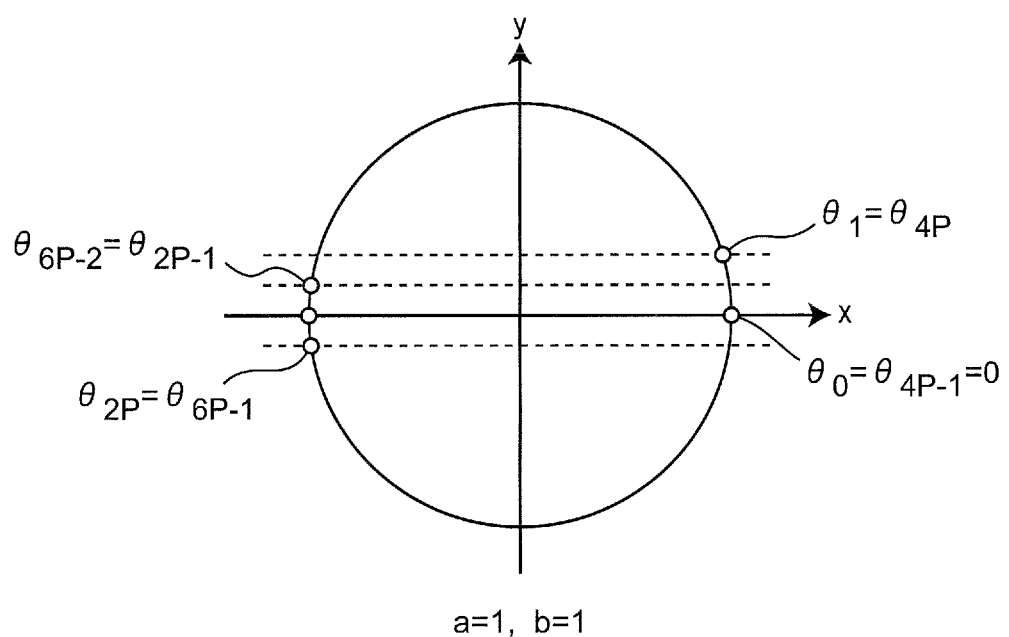
FIG. 7 is a characteristic diagram for explaining the deriving process of a calculating expression to calculate the drive conditions of the optical scanning apparatus of FIG. 1.

In the Equation (6), a case where N is an even number and the sign is plus is considered. In this case, an increment when n is increased by one is $f\pi/f_L$. Regarding the distribution manner of the phase $\theta_n$, it is considered that "$\theta_n$ makes almost two circuits for the interval of $[0, 2\pi]$ so that the phase $\theta_{2P}$ satisfies $\theta_{2P}=\pi(1+f/2f_L)$ with regard to a certain natural number P while n becomes $n_{max}$". The phase $\theta_n$ is uniformly distributed at intervals of $f\pi/2f_L$. The distribution manner is shown in FIG. 7.

In this case, the trace can sufficiently cover the whole screen since, for example, $\theta_{2P}$ and $\theta_{6P-1}$ intersect at an identical point although the intersecting manner with the y-axis, i.e., the inclination is varied. The inclination at the intersection in the case of the phase $\theta_n$ at the time is $(-1)^n \cos\theta_n$, and therefore, the inclination in the case of $\theta_{2P}$ can be obtained by the following equation:

$$(-1)^{2P}\cos\theta_{2P} = \cos\left\{\pi\left(1+\frac{f}{2f_L}\right)\right\}. \quad (26)$$

Moreover, in the case of $\theta_{6P-1}$, the inclination can be obtained by the following equation:

$$(-1)^{6P-1}\cos\theta_{6P-1} = (-1)*\cos\left\{3\pi\left(1+\frac{f}{2f_L}\right) - \pi\frac{f}{f_L}\right\} \quad (27)$$
$$= (-1)*\cos\left\{\pi\left(1+\frac{f}{2f_L}\right)\right\}.$$

It can be understood that both have mutually inverted signs and varied inclinations according to the Equation (26) and the Equation (27). The trace is able to sufficiently cover the whole screen and be drawn since the intersecting manners of the trace with the y-axis are varied although two or more overlaps occur at every intersection. In the case where N is an odd number, the inclination becomes identical and therefore undesirable.

In order that $\theta_n$ makes almost two circuits for the interval of $[0, 2\pi]$ while n becomes $n_{max}$, $n_{max}$ is any one of $4P-3$, $4P-2$, $4P-1$ and $4P$. In each case, P is obtained from the Equation (3) by the following equation:

$$\left[\frac{1}{4}\left(\frac{f_L}{Fr/2} + 3\right)\right] = P. \quad (28)$$

In this case, according to the Equation (7) and the relational expression $\theta_{2P}=\pi(1+f/2f_L)$ of the phase, the frequency f is obtained by the following equation:

$$f = \frac{f_L}{2P - \frac{1}{2}}. \quad (29)$$

Moreover, according to the high-speed side frequency $f_H = Nf_L \pm f$ (N: integer, $0 \le f < f_L$), the high-speed side frequency $f_H$ is obtained by the following equation:

$$f_H = Nf_L \pm \frac{2}{4P-1} f_L. \quad (30)$$

The above can be expanded as follows when generalized.

A positive integer "a" is chosen, and "b" is assumed to be any one of $-a, -a+1, \ldots, a-1$. The phase at the intersection with the y-axis is expressed by the following equation:

$$\theta_{2P} = \pm \pi \left(1 + \frac{2b+1}{2a} \frac{f}{f_L}\right). \quad (31)$$

When the Equation (31) can be set to be satisfied with respect to a certain positive integer P, the phase at the intersection with the y-axis is expressed by the following equations:

$$\theta_{4P} = \pm 2\pi \pm \pi \frac{2b+1}{a} \frac{f}{f_L} = \pm \pi \frac{2b+1}{a} \frac{f}{f_L}, \quad (32)$$

$$\theta_{4(2a)P} = \pm 2(2b+1)\pi \frac{f}{f_L}, \text{ and} \quad (33)$$

$$\theta_{4(2a)P-2(2b+1)} = 0. \quad (34)$$

This means that $\theta_n$ almost returns to the former one after 2a turns have been made. According to the Equation (32) to the Equation (34), $n_{max}$ is any one of $4(2a)P-(4b+3)$, $4(2a)P-(4b+2)$, ..., and P is expressed by the following equation:

$$P = \left[\frac{1}{4(2a)}\left(\frac{f_L}{Fr/2} + 4b + 3\right)\right]. \quad (35)$$

According to the Equation (31) and the Equation (6), the frequency f can be obtained by the following equation:

$$f = \frac{f_L}{2P - \frac{2b+1}{2a}}. \quad (36)$$

According to the Equation (35), the Equation (36) and the high-speed side frequency $f_H = Nf_L \pm f$ (N: integer, $0 \le f < f_L$), the high-speed side frequency $f_H$ is obtained by the following equation:

$$f_H = Nf_L \pm f = Nf_L \pm \frac{2a}{4aP - (2b+1)} f_L. \quad (37)$$

In this case, $a=1, 2, 3, \ldots, a$, and $b=-a, -a+1, \ldots, a-1$, and the maximum value $a_{max}$ of "a" can be obtained by substituting $b=a-1$ into the Equation (35) under the condition that P of the Equation (35) is a positive integer, and it can be expressed by the following equation:

$$a_{max} = \left[\frac{1}{4}\left(\frac{f_L}{Fr/2} - 1\right)\right]. \quad (38)$$

The aforementioned "Case 3" is the case where $a=1$ and $b=0$. In this case, the right term of the Equation (37), i.e., $2a/(4aP-(2b+1))$ should preferably be an irreducible fraction. This is because an overlap occurs in the phase $\theta_n$ not in the case of the irreducible fraction, and scanning with high resolution cannot be achieved.

Moreover, the frequency that the trace intersects with the y-axis in the frame rate Fr is $n_{max}+1$. The number of the case where the intersection with the Y axis at this time and the intersection at which the trace of the combination of the high-speed side frequency $f_H$ and the low-speed side frequency $f_L$ obtained from the Equation (37) intersects with the Y axis are different from each other is $8aP-4b-2$. A ratio of $8aP-4b-2$ to $n_{max}+1$ should desirably be not smaller than 0.6. This is because the overlap of the phase $\theta_n$ is increased when the ratio is smaller than 0.6. Moreover, when the high-speed side frequency $f_H$ and the low-speed side frequency $f_L$ are obtained by using the Mathematical Formulas (5) to (8), an even number is selected as N. The purpose is to deteriorate the resolution in the peripheral portion since a bias occurs in the inclination with respect to the intersection of the trace and the y-axis when N is an odd number.

Although the trace drawn by the scanning line has been cited as a problem, it is desirable that the temporal bias (transition of the trace every frame rate) should desirably be as little as possible when an image is displayed on a display apparatus or the like. The temporal bias can be expressed as follows.

The phase at the intersection with the y-axis is expressed by the Equation (6) or the like, an identical intersection results since $\sin(\pi-\theta)=\sin\theta$. If these are considered to be identical, the following relational expressions hold:

$$\theta_n^* = \frac{2}{\pi}\theta_n \quad \left(0 \le \theta_n \le \frac{\pi}{2}\right) \quad \text{(Relational Expression 5)}$$

$$= \frac{2}{\pi}(\pi - \theta_n) \quad \left(\frac{\pi}{2} < \theta_n \le \frac{3\pi}{2}\right) \quad \text{(Relational Expression 6)}$$

$$= \frac{2}{\pi}(\theta_n - 2\pi) \quad \left(\frac{3\pi}{2} < \theta_n \le 2\pi\right), \quad \text{(Relational Expression 7)}$$

where $-1 \le \theta_n^* \le 1$.

Moreover, the inclination can be expressed by $(-1)^n \cos\theta_n$. The phases $\theta_1^*, \theta_2^*, \ldots, \theta_{20}^*$ corresponding to the phases $\theta_1, \theta_2, \ldots, \theta_{20}$ of twenty intersections are grouped into the following two groups:

(1) a phase set $\{\theta_{u(1)}^*, \theta_{u(2)}^*, \ldots, \theta_{u(i)}^*\}$ with a positive inclination; and (2) a phase set $\{\theta_{d(1)}^*, \theta_{d(2)}^*, \ldots, \theta_{d(j)}^*\}$ with a negative inclination, where $i+j=20$.

The phase sets $\{\theta_{u(1)}^*, \theta_{u(2)}^*, \ldots, \theta_{u(i)}^*\}$ and $\{\theta_{d(1)}^*, \theta_{d(2)}^*, \ldots, \theta_{d(j)}^*\}$ are now rearranged in the ascending order, and assumed to be phase sets $\{\theta_{u(1)}^*, \theta_{u(2)}^*, \ldots, \theta_{u(i)}^*\}$ ($\theta_{U(1)}^* < \theta_{U(2)}^* < \ldots < \theta_{U(i)}^*$) and phase sets $\{\theta_{D(1)}^*, \theta_{D(2)}^*, \ldots, \theta_{D(j)}^*\}$ ($\theta_{D(1)}^* < \theta_{D(2)}^* < \ldots < \theta_{D(j)}^*$), respectively.

The maximum interval in terms of the topological meaning among the intersections of the respective inclinations can be expressed as follows, where it is noted that max{ } is a function that represents the maximum value of the values in the braces:

$$\max\{\theta_{U(1)}^*+1, \theta_{U(2)}^*-\theta_{U(1)}^*, \theta_{U(3)}^*-\theta_{U(2)}^*, \ldots, \theta_{U(i)}^*-\theta_{U(i-1)}^*, 1-\theta_{U(i)}^*\}, \text{ and}$$

$$\max\{\theta_{D(1)}^*+1, \theta_{D(2)}^*-\theta_{D(1)}^*, \theta_{D(3)}^*-\theta_{D(2)}^*, \ldots, \theta_{D(j)}^*-\theta_{D(j-1)}^*, 1-\theta_{D(j)}^*\}.$$

It is more desirable to select a combination of frequencies such that these values are each not greater than 0.4, when the temporal bias is a little.

First Implemental Example

An example, in which the optical reflection device is designed by using the aforementioned Equations, is described below. The design was made so that the drive frequency of the first driving part became 30 kHz or higher, and the drive frequency of the second driving part became 1 kHz or higher.

First of all, it is assumed that the frame rate Fr=30, and it is temporarily determined that the low-speed side frequency $f_L$=1100 Hz. Considering the Mathematical Formulas (5) to (8), $a_{max}$ is expressed by the following equation according to the Equation (38):

$$a_{max} = \left[\frac{1}{4}\left(\frac{1100}{30/2} - 1\right)\right] = [18.083] = 18.$$

In this case, it is determined that a=17 and b=15. According to the Equation (35), P is expressed by the following equation:

$$P = \left[\frac{1}{4(2 \times 17)}\left(\frac{1100}{30/2} + 4 \times 15 + 3\right)\right] = \left[\frac{1}{136}(73.333 + 63)\right] = [1.002] = 1.$$

P becomes one when the low-speed side frequency $f_L$ is between 1095 Hz and 3135 Hz. Within this range, the high-speed side frequency $f_H$ can be obtained by the following equation according to the Equation (37):

$$f_H = N \times f_L \pm \frac{2 \times 17}{4 \times 17 \times 1 - (2 \times 15 + 1)} f_L = \left(N \pm \frac{34}{37}\right) f_L. \quad (39)$$

For example, when N=28 and the sign is minus, the high-speed side frequency $f_H$=31062 Hz when the low-speed side frequency $f_L$=1147 Hz. As described above, by using the Equations derived in the invention of the present application, it is possible to design the low-speed side frequency $f_L$ and the high-speed side frequency $f_H$ very simply.

Figure 8:
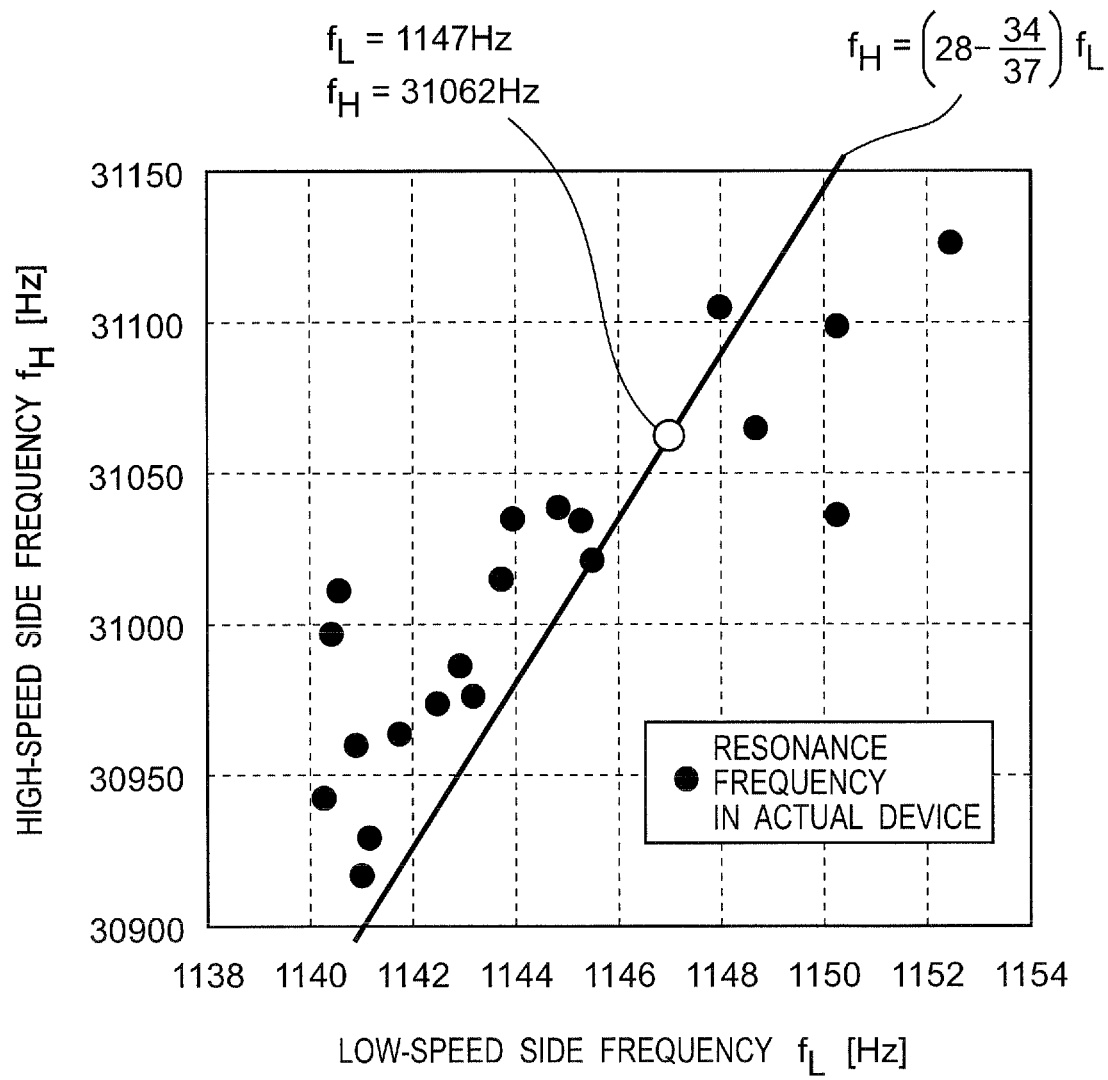
FIG. 8 is a characteristic diagram for explaining the results of calculating the drive conditions of the optical scanning apparatus of FIG. 1.

FIG. 8 illustrates resonance frequencies of the dual-axis optical reflection device (n=20), which is actually designed and produced so that the low-speed side frequency $f_L$=1147 Hz and the high-speed side frequency $f_H$=31062 Hz. Due to variations occurring in the trial manufacture stage, the first drive system (high-speed side) has a resonance frequency dispersion of ±0.5%, and the second drive system (low-speed side) has a resonance frequency dispersion of about ±1%. Moreover, regarding both the first drive system and the second drive system, the dispersions in this case do not occur at random but have definite correlations appearing on both sides. In this case, the point at which the low-speed side frequency $f_L$=1147 Hz and the high-speed side frequency $f_H$=31062 Hz of the designed targets and the conditional Equation (39) used in the designing stage are indicated by a straight line in FIG. 8.

In order to perform driving with the low-speed side frequency $f_L$=1147 Hz and the high-speed side frequency $f_H$=31062 Hz, it is required to perform driving at frequencies departing from the resonance frequency in many devices, and it is highly possible that a sufficient device characteristic (deflection angle) cannot be obtained. If the Equation (39) is targeted, the first drive system can be used at the resonance frequency within a range in which all the devices of n=20 have a deviation of ±4 Hz from the resonance frequency of the second drive system. As described above, it is possible to use the devices near the device resonance frequency, and this makes it possible to operate the devices with a sufficient device characteristic (deflection angle) and high efficiency.

Figure 9A:
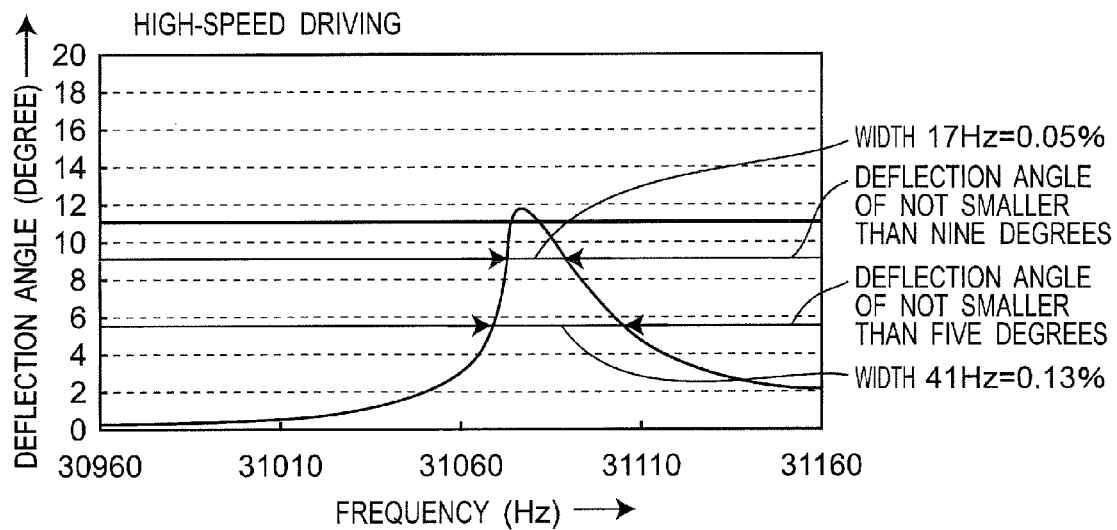
FIG. 9A is a characteristic graph for explaining the frequency characteristic of the deflection angle of a dual-axis optical reflection device driven by the optical scanning apparatus of FIG. 1.
Figure 9B:
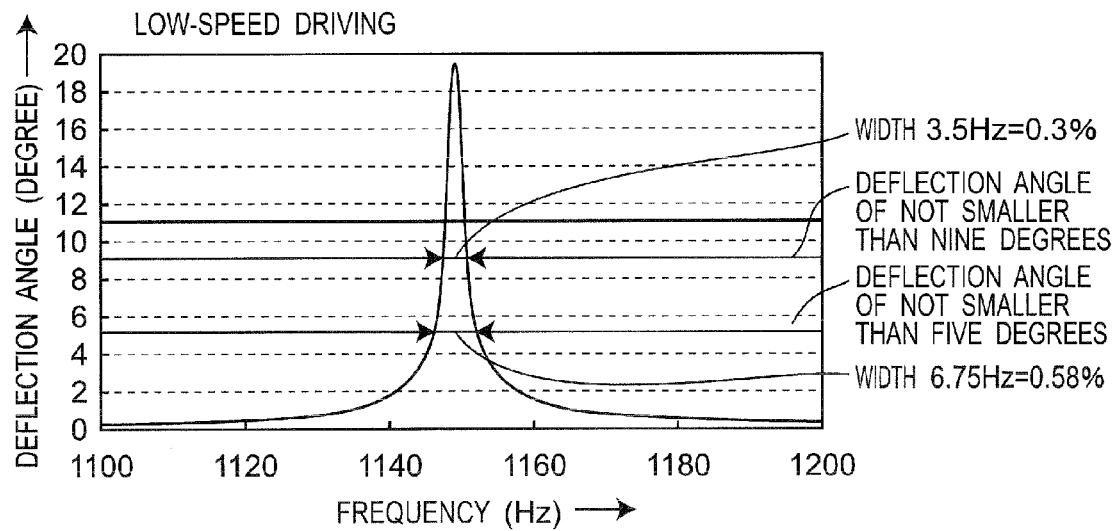
FIG. 9B is a characteristic graph for explaining the frequency characteristic of the deflection angle of a dual-axis optical reflection device driven by the optical scanning apparatus of FIG. 1.

FIGS. 9A and 9B illustrate frequency dependence of the device characteristic (deflection angle) of the first drive system (high-speed side) and the second drive system (low-speed side) of the dual-axis optical reflection device (n=20), which is designed and produced so that the low-speed side frequency $f_L$=1147 Hz and the high-speed side frequency $f_H$=31062 Hz.

When the dual-axis optical reflection device is scanned to project an image on the screen, the size of the image projected on the screen differs depending on the deflection angles of the drive systems. A larger image can be projected when the deflection angles of the drive systems are large even if a distance from the optical reflection device to the screen is short. Although a deflection angle of not smaller than nine degrees is ideally necessary for the scanning of the optical reflection device, a deflection angle of not smaller than five degrees is sufficient for practical uses.

It can be understood from FIGS. 9A and 9B that the deflection angle steeply decreases with respect to changes in the frequency regarding both the low-speed side frequency $f_L$ and the high-speed side frequency $f_H$.

Therefore, when scanning the second drive system (low-speed side), a deflection angle of not smaller than five degrees can be obtained at a frequency within a deviation of ±0.3% with respect to the low-speed side frequency $f_L$=1147 Hz as a reference, and a deflection angle of not smaller than nine degrees can be obtained at a frequency within a deviation of ±0.15% with respect to the low-speed side frequency $f_L$=1147 Hz as a reference. When scanning the first drive system (high-speed side), a deflection angle of not smaller than five degrees can be obtained at a frequency within a deviation of +0.09% or at a frequency within a deviation of −0.03%, and a deflection angle of not smaller than nine degrees can be obtained at a frequency within a deviation of +0.03% or at a frequency within a deviation of −0.02% with respect to the high-speed side frequency $f_H$=31062 Hz as a reference.

Second Implemental Example

Although resonance driving is used for both the first frequency and the second frequency, an example in which dissonance driving is used for the second frequency on the low-speed side is shown. With regard to this, it is acceptable to employ a dual-axis device that performs dissonance driving on the low-speed axis and resonance driving on the high-speed axis or to use a single-axis dissonance driving device on the low-speed axis and a single-axis resonance driving device on the high-speed axis in combination. When a dissonance driving device is driven by a sine wave, stable driving can be achieved without causing excitation in an unnecessary resonance mode since no higher harmonics, which are contained in a saw-tooth waveform or the like, are included.

In this case, since resonance driving is utilized on the high-speed axis, the device should desirably be driven most efficiently by being driven at its resonance frequency. For example, it is assumed that the resonance frequency is 30.235 kHz. When N=500, a=b=0, Fr=30 and the sign is plus in the Mathematical Formula (1), the following equation is obtained in a range in which P is one (range in which the low-speed side frequency $f_L$ is 45 Hz to 105 Hz):

$$f_H = \left(500 + \frac{1}{2}\right) f_L. \quad (40)$$

When the high-speed side frequency $f_H$ is 30.235 kHz according to the Equation (40), a low-speed side frequency $f_L$=60.41 Hz is obtained. Moreover, even when the resonance frequency of the high-speed axis fluctuates due to environmental changes of temperature or the like, precise scanning lines can be maintained by setting the resonance frequency of the low-speed axis in accordance with the resonance frequency of the high-speed axis.

It can be understood that using the Mathematical Formulas of the invention of the present application as described above is very effective in determining the combination of the frequencies for obtaining high resolution.

Determination Method of Drive Frequencies

The derivation method of the Mathematical Formulas for use in the invention of the present application has been described above. A method for determining the drive frequencies of the scanning device 11 by using the Mathematical Formulas is described below.

In the present preferred embodiment, the optical reflection device having the two pivot axes that are substantially perpendicular to each other as shown in FIG. 3 is used as the scanning device. As described above, in the optical reflection device is configured to include the reflecting part 17 for reflecting a beam of light from the light source to the center portion, and the first drive system including the first driving part 18 that pivots the reflecting part 17 around the first axis S1. Further, the optical reflection device further includes the second drive system including the second driving part 20 that pivots the first frame 19 including the first drive system around the second axis S2 that is substantially perpendicular to the first axis S1.

Figure 10:
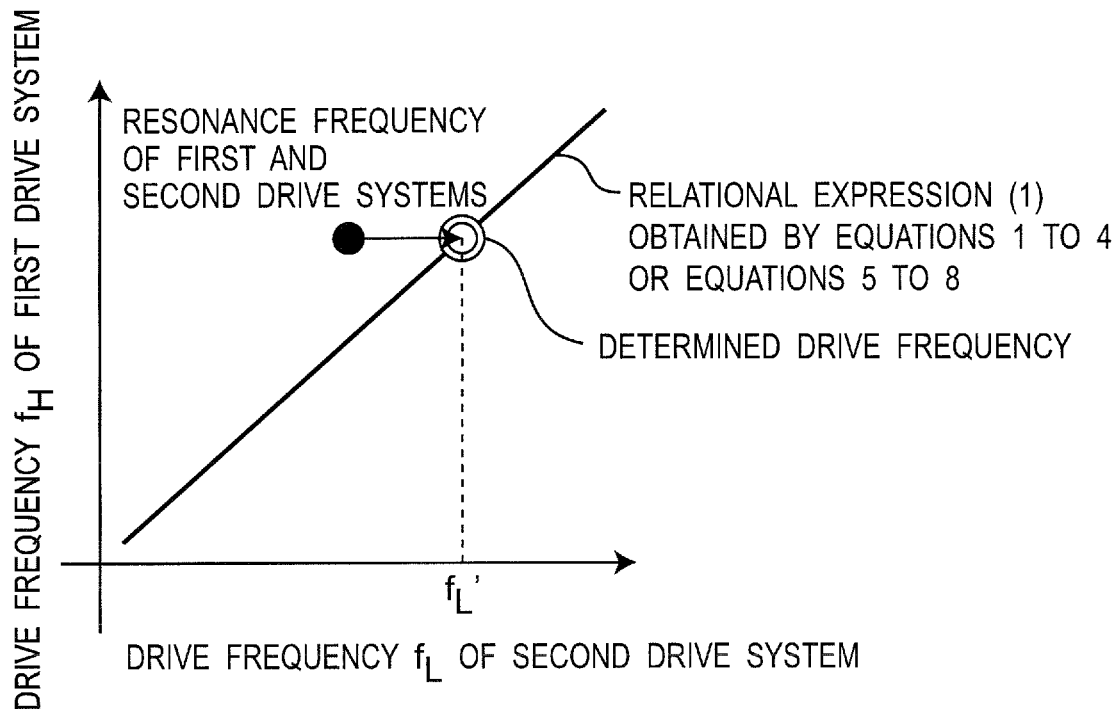
FIG. 10 is a graph showing a method for determining the drive frequencies with the optical scanning apparatus of FIG. 1.

When the resonance frequency of the first drive system is $f_Y$, the resonance frequency of the second drive system is $f_X$ ($f_Y > f_X$), and the resonance frequencies $f_Y$ and $f_X$ of the first and second drive systems are the peaks, a case where amplitudes corresponding to frequencies before and behind each peak are substantially symmetrical about the peak is considered. As shown in FIG. 10, plotting the drive frequency $f_L$ of the second drive system on the horizontal axis and plotting the drive frequency $f_H$ of the first drive system on the vertical axis, the calculating part 15 obtains a relational expression of $f_H$ and $f_L$ according to the Mathematical Formulas (1) to (4) or the Mathematical Formulas (5) to (8), the constants "a", N, Fr, and the like. Subsequently, resonance frequencies $f_Y$ and $f_X$ when these first and second drive systems are actually operated from the first and second monitors 14-1 and 14-2 are compared with reference values (values obtained by preliminary simulations or the like) preparatorily stored in the storage part of the calculating part 15. When a divergence from the reference value is not greater than a definite degree, the first and second drive systems are operated at the drive frequencies of the reference values. In this case, the optical reflection device is driven by setting $f_H = f_Y$ and $f_L = f_X$.

Moreover, when the actual resonance frequencies $f_Y$ and $f_X$ of the first and second drive systems obtained from the first and second monitors 14-1 and 14-2 diverge from the respective reference values by a definite degree or more, the drive frequencies are determined by the following method according to the relational expression (1) of $f_H$ and $f_L$ obtained as above.

In a case where priority is given to the amplitudes of the first and second drive systems, when the sizes of the first and second drive systems are on the same degree, the resonance frequencies of the axes differ from each other, and the axes are driven with an equal voltage according to the Q value attributed to the structure in the optical reflection device shown in FIG. 3, there is a possibility that the optical reflection device comes to have a more decreased $f_Y$ in terms of the amplitude on the high-frequency side than $f_X$ on the low frequency side. Therefore, the resonance frequency $f_Y$ on the high-frequency side is used as the drive frequency of the first drive system as it is, and only $f_X$ on the low-frequency side is determined according to the relational expression of $f_H$ and $f_L$ shown in FIG. 10. That is, with $f_H = f_Y$, a new $f_L'$ obtained from the relational expression (1) of $f_H$ and $f_L$ is determined as the drive frequency on the low-speed side. By thus performing correction, an optical scanning apparatus, of which the trace of the beam of light is precise and the amplitude of the optical reflection device is maximized, can be actualized. It is noted that the amplitude on the low-frequency side is secured at need by raising the applied voltage.

Figure 11:
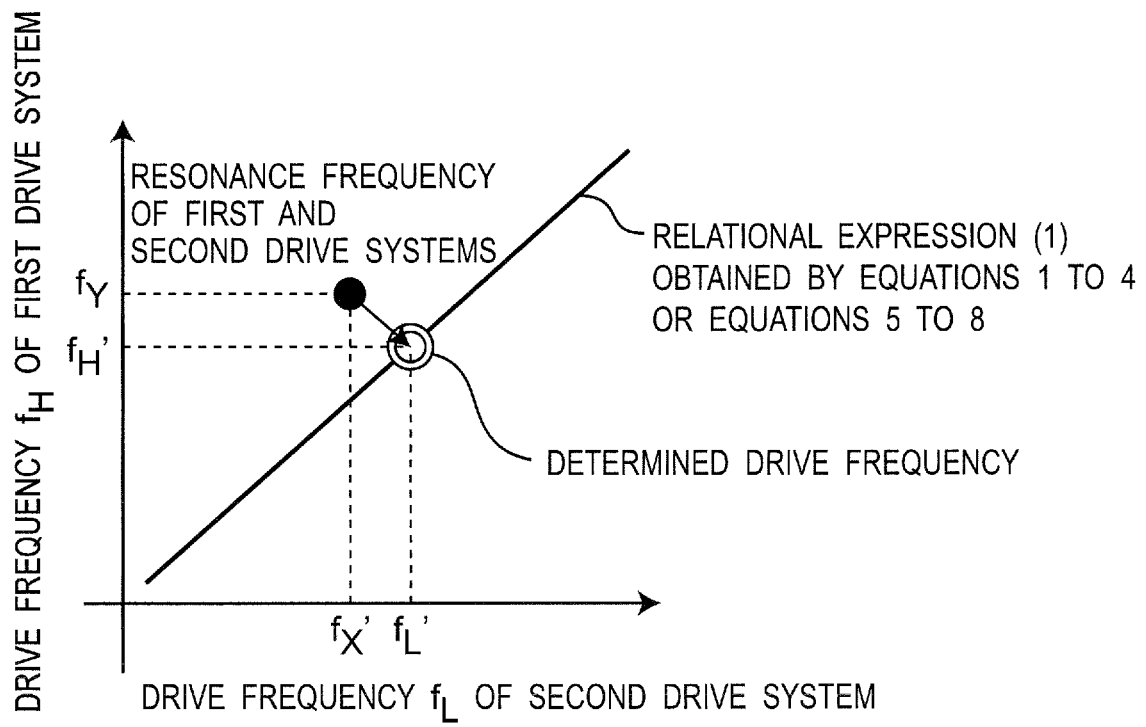
FIG. 11 is a graph showing a method for determining other drive frequencies with the optical scanning apparatus of FIG. 1.

Next, in a case where priority is given to the efficiencies of the first and second drive systems, the amplitude is decreased by making the drive frequency of one drive system diverge from the resonance frequency. The applied voltage of the drive system required to compensate for the decrease significantly rises than that of the other, and the scale of the circuit constituting the drive systems increases, leading to a possibility that the efficiencies in driving the optical scanning device might decrease. Therefore, both of the drive frequency $f_H$ on the high-frequency side and the drive frequency $f_L$ on the low-frequency side are calculated by the following method. First of all, the relational Equation (1) of $f_H$ and $f_L$ is obtained according to the Mathematical Formulas (1) to (4) or the Mathematical Formulas (5) to (8), the constants "a", N, Fr and the like as shown in FIG. 11. Subsequently, the resonance frequencies $f_Y$ and $f_X$ when these first and second drive systems are actually operated from the first and second monitors 14-1 and 14-2 are compared with the reference values (values obtained by preliminary simulations or the like) preparatorily stored in the storage part of the calculating part 15. When a divergence from the reference value is greater than a definite degree, the drive frequencies $f_H$ and $f_L$ of the first and second drive systems proximate to these resonance frequencies $f_Y$ and $f_X$ are determined from the relational expression (1) by using the least-square method.

In detail, the relational expression (1) is obtained by plotting the drive frequency $f_L$ of the second drive system on the horizontal axis and plotting the drive frequency $f_H$ of the first drive system on the vertical axis. Subsequently, the resonance frequencies $f_Y$ and $f_X$ of the first and second drive systems are plotted as ($f_X$, $f_Y$). The coordinates ($f_L'$, $f_H'$) on the relational expression (1) proximate to the plotted coordinates ($f_X$, $f_Y$) are obtained as the corrected drive frequencies. That is, the coordinates ($f_L'$, $f_H'$) on the relational expression (1) such that $(f_L - f_X)2 + (f_H - f_Y)2$ is minimized are obtained and determined as the drive frequencies of the first and second drive systems. By thus performing correction, an optical scanning apparatus of which the trace of the beam of light is precise, the circuit scale concerning driving is equal, and the efficiency is high can be actualized.

Figure 12:
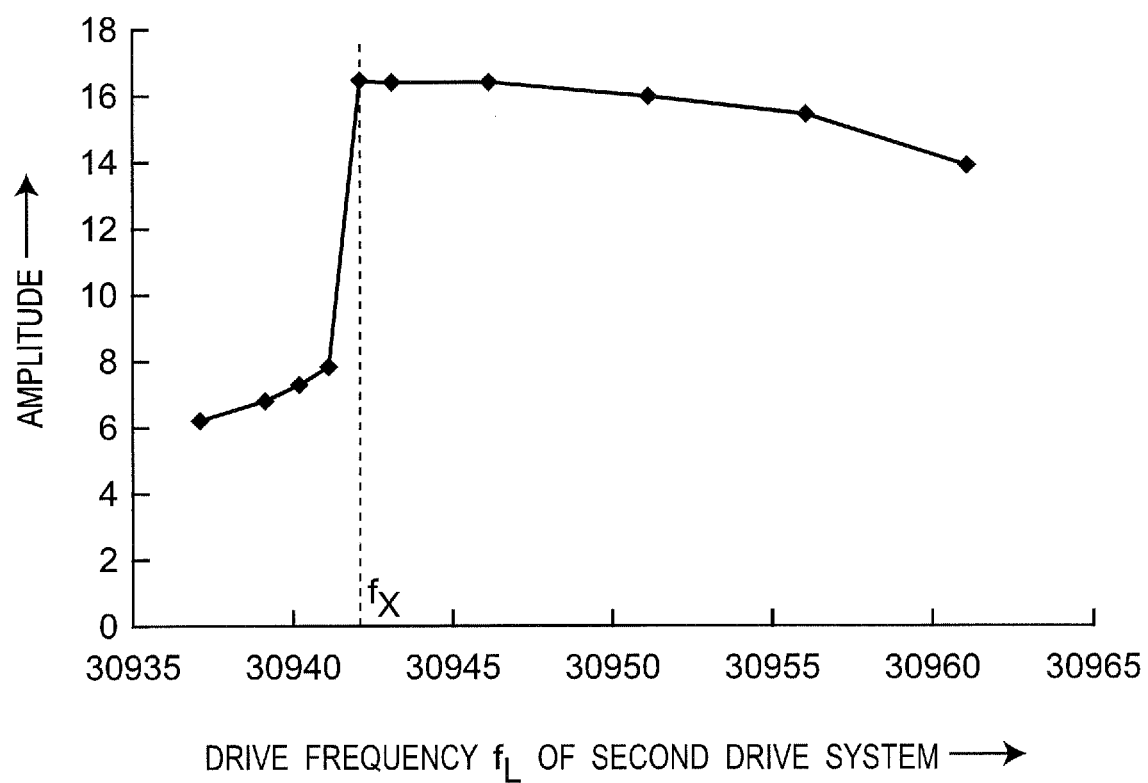
FIG. 12 is a characteristic graph for explaining the resonance frequency characteristic of a second drive system for use in the optical scanning apparatus of FIG. 1.
Figure 13:
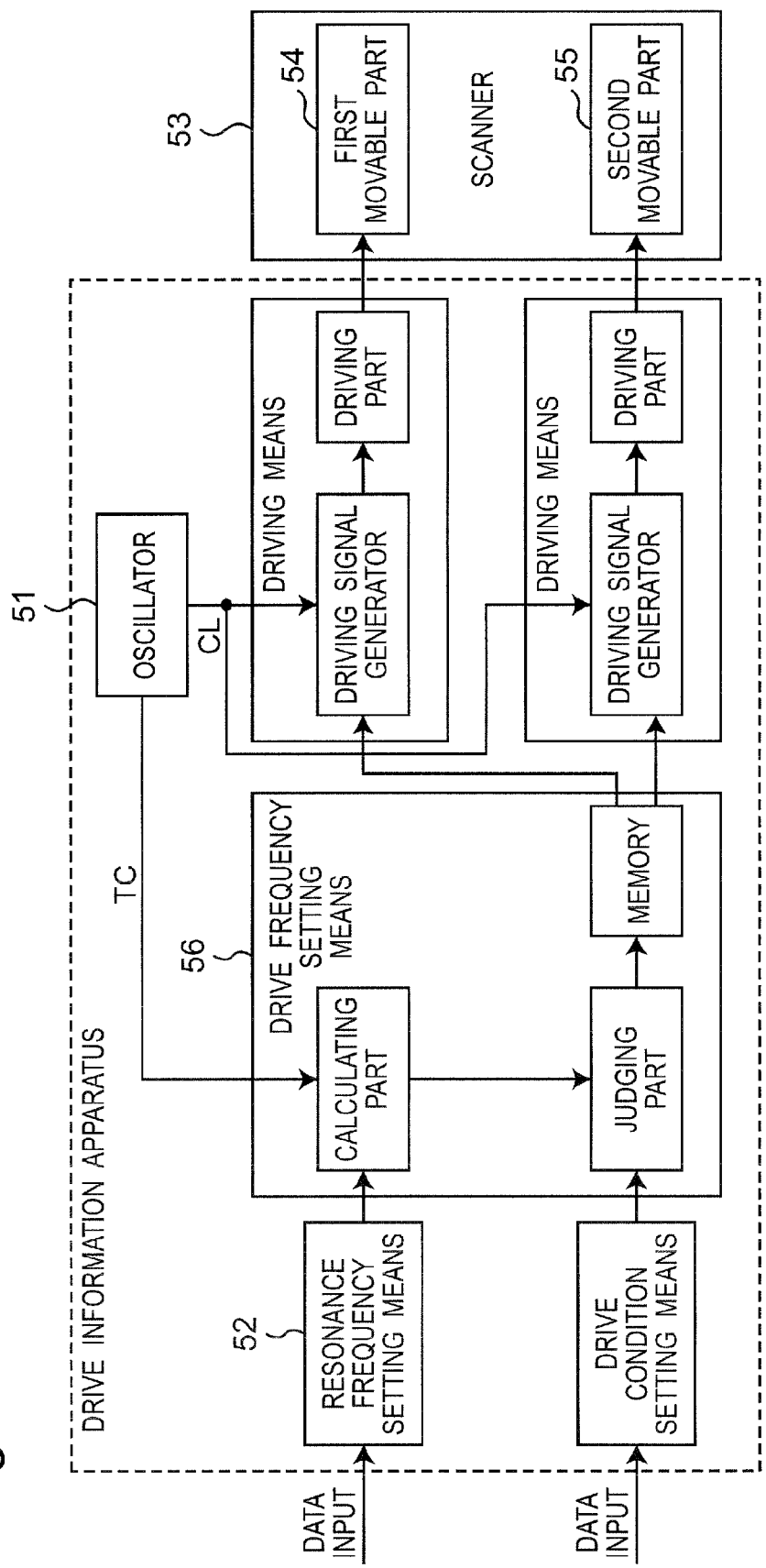
FIG. 13 is a block diagram showing a configuration of the optical scanning apparatus of the first prior art.

Next, a case where the resonance frequencies $f_Y$ and $f_X$ of the first and second drive systems are the peaks, and amplitudes with respect to frequencies before and behind the peaks become asymmetrical is considered. In the present preferred embodiment, as a concrete example, a case as shown in FIG. 12, in which the rate of change in amplitude is steep on the low-frequency side before and behind the resonance frequency $f_X$ of the second drive system, and the rate of change in amplitude is comparatively gentle on the high-frequency side in comparison with the low-frequency side is considered.

According to the method described above, the actual drive frequencies of the first and second drive systems are measured by the first and second monitors 14-1 and 14-2, and thereafter, the drive frequency of at least one drive system is calculated by using the relational expression (1). At this time, the drive frequencies ($f_L'$, $f_H'$) of the first and second drive systems are obtained from the relational expression (1) and the actual resonance frequencies ($f_X$, $f_Y$) of the first and second drive systems. The drive frequencies ($f_L'$, $f_H'$) of the first and second driving parts are determined to be on the frequency side where the rate of change in amplitude is smaller with respect to the frequency by comparing the drive frequencies ($f_L'$, $f_H'$) of the first and second driving parts before and behind the resonance frequency. For example, in FIG. 12, the rate of change in amplitude is smaller and flat on the high-frequency side than on the low-frequency side across the resonance frequency $f_X$, and therefore, $f_L'$ is determined to be on the higher frequency side of the resonance frequency $f_X$. With this arrangement, a stable optical scanning apparatus that does not influence the screen size and the like can be actualized by driving the optical reflection device in the region where the rate of change in amplitude is gentle even if the resonance frequency and the calculated drive frequency diverge from each other.

In addition, since the drive systems of the present invention execute frequency control to the conditional equations of the primary ray shape instead of comprehensively searching for the drive frequency conditions. Therefore, it is needless to say that the calculation efficiency of the optical scanning apparatus that achieves precise trace of the beam of light is high.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

The optical scanning apparatus of the present invention has the advantageous effects capable of achieving highly accurate scanning of a beam of light, and is useful for radar apparatuses, projection type display apparatuses and the like.

What is claimed is:

1. An optical scanning apparatus, comprising:
a light source that emits a beam of light; and
a scanning device that scans the beam of light in two axial directions that are substantially perpendicular to each other at a first frequency $f_H$ and a second frequency $f_L$,
wherein the first frequency $f_H$ and the second frequency $f_L$ have relations determined according to following Mathematical Formulas 1 to 4 or following Mathematical Formulas 5 to 8:

$$f_H = N \times f_L \pm \frac{1}{2}\frac{(2a+1)f_L}{(2a+1)P-b}, \quad \text{[Mathematical Formula 1]}$$

$$a = 1, 2, 3, \ldots \text{ and } a_{max} = \left[\frac{1}{4}\left(\frac{f_L}{\frac{Fr}{2}} - 3\right)\right], \quad \text{[Mathematical Formula 2]}$$

$$b = \pm 1, \pm 2, \ldots, a, \text{ and} \quad \text{[Mathematical Formula 3]}$$

$$P = \left[\frac{1}{4(2a+1)}\left(\frac{f_L}{\frac{Fr}{2}} + 4b + 1\right)\right], \quad \text{[Mathematical Formula 4]}$$

in the Mathematical Formulas 1 to 4, "a" is an arbitrary integer having a maximum value $a_{max}$, N is a positive integer, Fr is a frame rate, [ ] represents a Gauss symbol, and a=b=0 is included as a special case:

$$f_H = N \times f_L \pm \frac{2af_L}{4aP-(2b+1)}, \quad \text{[Mathematical Formula 5]}$$

$$a = 1, 2, 3, \ldots \text{ and } a_{max} = \left[\frac{1}{4}\left(\frac{f_L}{\frac{Fr}{2}} - 1\right)\right], \quad \text{[Mathematical Formula 6]}$$

$$b = -a, -a+1, \ldots, a-1, \text{ and} \quad \text{[Mathematical Formula 7]}$$

$$P = \left[\frac{1}{4(2a)}\left(\frac{f_L}{\frac{Fr}{2}} + 4b + 3\right)\right], \quad \text{[Mathematical Formula 8]}$$

in the Mathematical Formulas 5 to 8, "a" is an arbitrary integer having a maximum value $a_{max}$, "b" is an integer within a range of −a to a−1, N is a positive even number, Fr is the frame rate, and [ ] represents the Gauss symbol.

2. An optical scanning apparatus, comprising:
a light source that emits a beam of light; and
a scanning device that scans the beam of light in two axial directions that are substantially perpendicular to each other at a first frequency $f_H$ and a second frequency $f_L$,
wherein the first frequency $f_H$ and the second frequency $f_L$ are determined according to following Mathematical Formulas 9 to 12 or following Mathematical Formulas 13 to 16,
wherein the first frequency $f_H$ has a relation of being within +0.09% or −0.03% from the determined frequency, and
wherein the second frequency $f_L$ has a relation of being within ±0.3% from the determined frequency, $$f_H = N \times f_L \pm \frac{1}{2}\frac{(2a+1)f_L}{(2a+1)P-b}, \quad \text{[Mathematical Formula 9]}$$

$$a = 1, 2, 3, \ldots \text{ and } a_{max} = \left[\frac{1}{4}\left(\frac{f_L}{\frac{Fr}{2}} - 3\right)\right], \quad \text{[Mathematical Formula 10]}$$

$$b = \pm 1, \pm 2, \ldots, a, \text{ and} \quad \text{[Mathematical Formula 11]}$$

$$P = \left[\frac{1}{4(2a+1)}\left(\frac{f_L}{\frac{Fr}{2}} + 4b + 1\right)\right], \quad \text{[Mathematical Formula 12]}$$

in the Mathematical Formulas 9 to 12, "a" is an arbitrary integer having a maximum value $a_{max}$, N is a positive integer, Fr is a frame rate, [ ] represents a Gauss symbol, and o=b=0 is included as a special case, $$f_H = N \times f_L \pm \frac{2af_L}{4aP - (2b+1)},$$ [Mathematical Formula 13]

$$a = 1, 2, 3, \ldots \text{ and } a_{max} = \left[\frac{1}{4}\left(\frac{f_L}{\frac{Fr}{2}} - 1\right)\right],$$ [Mathematical Formula 14]

$$b = -a, -a+1, \ldots, a-1, \text{ and}$$ [Mathematical Formula 15]

$$P = \left[\frac{1}{4(2a)}\left(\frac{f_L}{\frac{Fr}{2}} + 4b + 3\right)\right],$$ [Mathematical Formula 16]

in the Mathematical Formulas 13 to 16, "a" is an arbitrary integer having a maximum value $a_{max}$, "b" is an integer within a range of $-a$ to $a-1$, N is a positive even number, Fr is the frame rate, and [ ] represents the Gauss symbol.

3. An optical scanning apparatus comprising:
a light source that emits a beam of light; and
a scanning device that scans the beam of light in two axial directions that are substantially perpendicular to each other at a first frequency $f_H$ and a second frequency $f_L$,
wherein the scanning device calculates the first frequency $f_H$ and the second frequency $f_L$ by using following Mathematical Formulas 17 to 20 or following Mathematical Formulas 21 to 24, and scans the beam of light at the calculated first frequency $f_H$ and the second frequency $f_L$, $$f_H = N \times f_L \pm \frac{1}{2}\frac{(2a+1)f_L}{(2a+1)P - b},$$ [Mathematical Formula 17]

$$a = 1, 2, 3, \ldots \text{ and } a_{max} = \left[\frac{1}{4}\left(\frac{f_L}{\frac{Fr}{2}} - 3\right)\right],$$ [Mathematical Formula 18]

$$b = \pm 1, \pm 2, \ldots, a, \text{ and}$$ [Mathematical Formula 19]

$$P = \left[\frac{1}{4(2a+1)}\left(\frac{f_L}{\frac{Fr}{2}} + 4b + 1\right)\right],$$ [Mathematical Formula 20]

in the Mathematical Formulas 17 to 20, "a" is an arbitrary integer having a maximum value $a_{max}$, N is a positive integer, Fr is a frame rate, [ ] represents a Gauss symbol, and a=b=0 is included as a special case, $$f_H = N \times f_L \pm \frac{2af_L}{4aP - (2b+1)},$$ [Mathematical Formula 21]

$$a = 1, 2, 3, \ldots \text{ and } a_{max} = \left[\frac{1}{4}\left(\frac{f_L}{\frac{Fr}{2}} - 1\right)\right],$$ [Mathematical Formula 22]

$$b = -a, -a+1, \ldots, a-1, \text{ and}$$ [Mathematical Formula 23]

$$P = \left[\frac{1}{4(2a)}\left(\frac{f_L}{\frac{Fr}{2}} + 4b + 3\right)\right],$$ [Mathematical Formula 24]

in the Mathematical Formulas 21 to 24, "a" is an arbitrary integer having a maximum value $a_{max}$, "b" is an integer within a range of $-a$ to $a-1$, N is a positive even number, Fr is the frame rate, and [ ] represents the Gauss symbol.

4. The optical scanning apparatus as claimed in claim 1, wherein the scanning device scans the beam of light by using a sine wave.

5. The optical scanning apparatus as claimed in claim 4, wherein the scanning device comprises:
an optical reflection device including a reflecting part that reflects the beam of light and a driving part that pivots the reflecting part around two axes substantially perpendicular to each other; and
a control part that controls the optical reflection device.

6. The optical scanning apparatus as claimed in claim 4, wherein the scanning device comprises:
a first optical reflection device including a first reflecting part, and a first driving part that pivots the first reflecting part around a first axis;
a second optical reflection device including a second reflecting part and a second driving part that pivots the second reflecting part around a second axis; and
a control part that controls the first and second optical reflection devices, and
wherein the beam of light is reflected sequentially to the first reflecting part and the second reflecting part, and the first axis and the second axis are arranged to be substantially perpendicular to each other.

7. An optical reflection device for use in an optical scanning apparatus, the optical scanning apparatus comprising:
an optical reflection device including a reflecting part that reflects a beam of light and a driving part that pivots the reflecting part around two axes substantially perpendicular to each other; and
a control part that controls the optical reflection device,
wherein the optical reflection device comprises:
a first drive system including a first driving part that pivots the reflecting part around a first axis; and
a second drive system including a second driving part that pivots the first drive system around a second axis perpendicular to the first axis, and
wherein, when a resonance frequency of the first drive system is $f_H$ and a resonance frequency of the second drive system is $f_L$, then the resonance frequencies $f_H$ and $f_L$ have relations determined according to following Mathematical Formulas 25 to 28 or following Mathematical Formulas 29 to 32:

$$f_H = N \times f_L \pm \frac{1}{2}\frac{(2a+1)f_L}{(2a+1)P - b},$$ [Mathematical Formula 25]

$$a = 1, 2, 3, \ldots \text{ and } a_{max} = \left[\frac{1}{4}\left(\frac{f_L}{\frac{Fr}{2}} - 3\right)\right],$$ [Mathematical Formula 26]

$$b = \pm 1, \pm 2, \ldots, a, \text{ and}$$ [Mathematical Formula 27]

$$P = \left[\frac{1}{4(2a+1)}\left(\frac{f_L}{\frac{Fr}{2}} + 4b + 1\right)\right],$$ [Mathematical Formula 28]

in the Mathematical Formulas 25 to 28, "a" is an arbitrary integer having a maximum value $a_{max}$, N is a positive integer, Fr is a frame rate, [ ] represents a Gauss symbol, and a=b=0 is included as a special case, $$f_H = N \times f_L \pm \frac{2af_L}{4aP - (2b+1)},$$ [Mathematical Formula 29]

$$a = 1, 2, 3, \ldots \text{ and } a_{max} = \left[\frac{1}{4}\left(\frac{f_L}{\frac{Fr}{2}} - 1\right)\right],$$ [Mathematical Formula 30]

$$b = -a, -a+1, \ldots, a-1, \text{ and}$$ [Mathematical Formula 31]

-continued $$P = \left[\frac{1}{4(2a)}\left(\frac{f_L}{\frac{Fr}{2}} + 4b + 3\right)\right],$$ [Mathematical Formula 32]

in the Mathematical Formulas 29 to 32, "a" is an arbitrary integer having a maximum value $a_{max}$, "b" is an integer within a range of −a to a−1, N is a positive even number, Fr is the frame rate, and [ ] represents the Gauss symbol.

8. An optical reflection device for use in an optical scanning apparatus, the optical scanning apparatus comprising:
   an optical reflection device including a reflecting part that reflects a beam of light and a driving part that pivots the reflecting part around two axes substantially perpendicular to each other; and
   a control part that controls the optical reflection device,
   wherein the optical reflection device comprises:
   a first drive system including a first driving part that pivots the reflecting part around a first axis; and
   a second drive system including a second driving part that pivots the first drive system around a second axis perpendicular to the first axis, and
   wherein, when a resonance frequency of the first drive system is $f_H$ and a resonance frequency of the second drive system is $f_L$, then the resonance frequencies $f_H$ and $f_L$ are determined according to following Mathematical Formulas 33 to 36 or following Mathematical Formulas 37 to 40,
   wherein the first frequency $f_H$ has a relation of being within +0.09% or −0.03% from the determined frequency, and
   wherein the second frequency $f_L$ has a relation of being within ±0.3% from the determined frequency, $$f_H = N \times f_L \pm \frac{1}{2}\frac{(2a+1)f_L}{(2a+1)P - b},$$ [Mathematical Formula 33]

$$a = 1, 2, 3, \ldots \text{ and } a_{max} = \left[\frac{1}{4}\left(\frac{f_L}{\frac{Fr}{2}} - 3\right)\right],$$ [Mathematical Formula 34]

$$b = \pm 1, \pm 2, \ldots, a, \text{ and}$$ [Mathematical Formula 35]

$$P = \left[\frac{1}{4(2a+1)}\left(\frac{f_L}{\frac{Fr}{2}} + 4b + 1\right)\right],$$ [Mathematical Formula 36]

in the Mathematical Formulas 33 to 36, "a" is an arbitrary integer having a maximum value $a_{max}$, N is a positive integer, Fr is a frame rate, [ ] represents a Gauss symbol, and a=b=0 is included as a special case, $$f_H = N \times f_L \pm \frac{2af_L}{4aP - (2b+1)},$$ [Mathematical Formula 37]

$$a = 1, 2, 3, \ldots \text{ and } a_{max} = \left[\frac{1}{4}\left(\frac{f_L}{\frac{Fr}{2}} - 1\right)\right],$$ [Mathematical Formula 38]

$$b = -a, -a+1, \ldots, a-1, \text{ and}$$ [Mathematical Formula 39]

$$P = \left[\frac{1}{4(2a)}\left(\frac{f_L}{\frac{Fr}{2}} + 4b + 3\right)\right],$$ [Mathematical Formula 40]

in the Mathematical Formulas 37 to 40, "a" is an arbitrary integer having a maximum value $a_{max}$, "b" is an integer within a range of −a to a−1, N is a positive even number, Fr is the frame rate, and [ ] represents the Gauss symbol.

9. An optical reflection device for use in an optical scanning apparatus, the optical scanning apparatus comprising:
   an optical reflection device including a reflecting part that reflects a beam of light and a driving part that pivots the reflecting part around two axes that are mutually substantially perpendicular; and
   a control part that controls the optical reflection device,
   wherein the optical reflection device comprises:
   a first drive system including a first driving part that pivots the reflecting part around a first axis; and
   a second drive system including a second driving part that pivots the first drive system around a second axis perpendicular to the first axis, and
   wherein, when a resonance frequency of the first drive system is $f_H$ and a resonance frequency of the second drive system is $f_L$, then the resonance frequencies $f_H$ and $f_L$ are calculated by using following Mathematical Formulas 41 to 44 or following Mathematical Formulas 45 to 48, and are set as respective drive frequencies in the first and second drive systems:

$$f_H = N \times f_L \pm \frac{1}{2}\frac{(2a+1)f_L}{(2a+1)P - b},$$ [Mathematical Formula 41]

$$a = 1, 2, 3, \ldots \text{ and } a_{max} = \left[\frac{1}{4}\left(\frac{f_L}{\frac{Fr}{2}} - 3\right)\right],$$ [Mathematical Formula 42]

$$b = \pm 1, \pm 2, \ldots, a, \text{ and}$$ [Mathematical Formula 43]

$$P = \left[\frac{1}{4(2a+1)}\left(\frac{f_L}{\frac{Fr}{2}} + 4b + 1\right)\right],$$ [Mathematical Formula 44]

in the Mathematical Formulas 41 to 44, "a" is an arbitrary integer having a maximum value $a_{max}$, N is a positive integer, Fr is a frame rate, [ ] represents a Gauss symbol, and a=b=0 is included as a special case, $$f_H = N \times f_L \pm \frac{2af_L}{4aP - (2b+1)},$$ [Mathematical Formula 45]

$$a = 1, 2, 3, \ldots \text{ and } a_{max} = \left[\frac{1}{4}\left(\frac{f_L}{\frac{Fr}{2}} - 1\right)\right],$$ [Mathematical Formula 46]

$$b = -a, -a+1, \ldots, a-1, \text{ and}$$ [Mathematical Formula 47]

$$P = \left[\frac{1}{4(2a)}\left(\frac{f_L}{\frac{Fr}{2}} + 4b + 3\right)\right],$$ [Mathematical Formula 48]

in the Mathematical Formulas 45 to 48, "a" is an arbitrary integer having a maximum value $a_{max}$, "b" is an integer within a range of −a to a−1, N is a positive even number, Fr is the frame rate, and [ ] represents the Gauss symbol.

10. An optical scanning apparatus, comprising:
    a light source that emits a beam of light;
    an optical reflection device that scans the beam of light around first and second axes that are mutually substantially perpendicular; and
    a control part that controls the optical reflection device,
    wherein the optical reflection device comprises:

a mirror part;

a first drive system including a first driving part that pivots the mirror part around a first axis; and a second drive system including a second driving part that pivots the first drive system around a second axis that is substantially perpendicular to the first axis, and wherein, when a resonance frequency of the first drive system is $f_Y$, and a resonance frequency of the second drive system is $f_X$, then the control part calculates a relational expression of $f_H$ and $f_L$ by using following Mathematical Formulas 49 to 52 or following Mathematical Formulas 53 to 56, thereafter obtains $f_L'$ with $f_H = f_Y$ in the relational expression, and sets $f_H'$ and $f_L'$ to the drive frequency of the first driving part and the drive frequency of the second driving part, respectively:

$$f_H = N \times f_L \pm \frac{1}{2} \frac{(2a+1)f_L}{(2a+1)P-b},$$ [Mathematical Formula 49]

$$a = 1, 2, 3, \ldots \text{ and } a_{max} = \left[\frac{1}{4}\left(\frac{f_L}{\frac{Fr}{2}} - 3\right)\right],$$ [Mathematical Formula 50]

$$b = \pm 1, \pm 2, \ldots, a, \text{ and}$$ [Mathematical Formula 51]

$$P = \left[\frac{1}{4(2a+1)}\left(\frac{f_L}{\frac{Fr}{2}} + 4b + 1\right)\right],$$ [Mathematical Formula 52]

in the Mathematical Formulas 49 to 52,
"a" is an arbitrary integer having a maximum value $a_{max}$,
N is a positive integer,
Fr is a frame rate, and
[ ] represents a Gauss symbol, $$f_H = N \times f_L \pm \frac{2af_L}{4aP - (2b+1)},$$ [Mathematical Formula 53]

$$a = 1, 2, 3, \ldots \text{ and } a_{max} = \left[\frac{1}{4}\left(\frac{f_L}{\frac{Fr}{2}} - 1\right)\right],$$ [Mathematical Formula 54]

$$b = -a, -a+1, \ldots, a-1, \text{ and}$$ [Mathematical Formula 55]

$$P = \left[\frac{1}{4(2a)}\left(\frac{f_L}{\frac{Fr}{2}} + 4b + 3\right)\right],$$ [Mathematical Formula 56]

in the Mathematical Formulas 53 to 56,
"a" is an arbitrary integer having a maximum value $a_{max}$,
"b" is an integer within a range of $-a$ to $a-1$,
N is a positive integer,
Fr is the frame rate, and
[ ] represents the Gauss symbol.

11. The optical scanning apparatus as claimed in claim 10, wherein the drive frequency $f_L$ of the second driving part is higher than the resonance frequency $f_X$ of the second drive system.

12. The optical scanning apparatus as claimed in claim 10, wherein, when the resonance frequency $f_Y$ of the first drive system or the resonance frequency $f_X$ of the second drive system has an amplitude asymmetrical before and behind the resonance frequency, the drive frequencies ($f_L'$, $f_H'$) of the first and second driving parts are on the frequency side where the rate of change in amplitude is smaller with respect to the frequency by comparing the drive frequencies ($f_L'$, $f_H'$) of the first and second driving parts before and behind the resonance frequency.

13. An optical scanning apparatus, comprising:

a light source that emits a beam of light;

an optical reflection device that scans the beam of light around first and second axes substantially perpendicular to each other; and a control part that controls the optical reflection device, wherein the optical reflection device comprises:

a mirror part;

a first drive system including a first driving part that pivots the mirror part around a first axis; and a second drive system including a second driving part that pivots the first drive system around a second axis that is substantially perpendicular to the first axis, and wherein, when a resonance frequency of the first drive system is $f_Y$, and a resonance frequency of the second drive system is $f_X$, then the control part calculates a relational expression of $f_H$ and $f_L$ by using following Mathematical Formulas 57 to 60 or following Mathematical Formulas 61 to 64, thereafter obtains an intersection ($f_L'$, $f_H'$) of the resonance frequencies ($f_X$, $f_Y$) obtained by the least-square method and the relational expression, and sets $f_H'$ and $f_L'$ to the drive frequency of the first driving part and the drive frequency of the second driving part, respectively:

$$f_H = N \times f_L \pm \frac{1}{2}\frac{(2a+1)f_L}{(2a+1)P-b},$$ [Mathematical Formula 57]

$$a = 1, 2, 3, \ldots \text{ and } a_{max} = \left[\frac{1}{4}\left(\frac{f_L}{\frac{Fr}{2}} - 3\right)\right],$$ [Mathematical Formula 58]

$$b = \pm 1, \pm 2, \ldots, a, \text{ and}$$ [Mathematical Formula 59]

$$P = \left[\frac{1}{4(2a+1)}\left(\frac{f_L}{\frac{Fr}{2}} + 4b + 1\right)\right],$$ [Mathematical Formula 60]

in the Mathematical Formulas 57 to 60,
"a" is an arbitrary integer having a maximum value $a_{max}$,
N is a positive integer,
Fr is a frame rate, and
[ ] represents the Gauss symbol, $$f_H = N \times f_L \pm \frac{2af_L}{4aP-(2b+1)},$$ [Mathematical Formula 61]

$$a = 1, 2, 3, \ldots \text{ and } a_{max} = \left[\frac{1}{4}\left(\frac{f_L}{\frac{Fr}{2}} - 1\right)\right],$$ [Mathematical Formula 62]

$$b = -a, -a+1, \ldots, a-1, \text{ and}$$ [Mathematical Formula 63]

$$P = \left[\frac{1}{4(2a)}\left(\frac{f_L}{\frac{Fr}{2}} + 4b + 3\right)\right],$$ [Mathematical Formula 64]

in the Mathematical Formulas 61 to 64,
"a" is an arbitrary integer having a maximum value $a_{max}$,
"b" is an integer within a range of $-a$ to $a-1$,
N is a positive integer,
Fr is the frame rate, and
[ ] represents the Gauss symbol.

14. The optical scanning apparatus as claimed in claim 13, wherein, when the resonance frequency $f_Y$ of the first drive system or the resonance frequency $f_X$ of the second drive system has an amplitude asymmetrical before and behind the resonance frequency, the drive frequencies ($f_L'$, $f_H'$) of the first and second driving parts are on the frequency side where the rate of change in amplitude is smaller with respect to the frequency by comparing the drive frequencies ($f_L'$, $f_H'$) of the first and second driving parts before and behind the resonance frequency.

* * * * *